(12) United States Patent
Kasahara et al.

(10) Patent No.: US 11,035,726 B2
(45) Date of Patent: Jun. 15, 2021

(54) LIGHT DETECTION DEVICE

(71) Applicant: HAMAMATSU PHOTONICS K.K., Hamamatsu (JP)

(72) Inventors: Takashi Kasahara, Hamamatsu (JP); Katsumi Shibayama, Hamamatsu (JP); Masaki Hirose, Hamamatsu (JP); Toshimitsu Kawai, Hamamatsu (JP); Hiroki Oyama, Hamamatsu (JP); Yumi Kuramoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 50 days.

(21) Appl. No.: 16/488,742

(22) PCT Filed: Feb. 26, 2018

(86) PCT No.: PCT/JP2018/006969
§ 371 (c)(1),
(2) Date: Aug. 26, 2019

(87) PCT Pub. No.: WO2018/159533
PCT Pub. Date: Sep. 7, 2018

(65) Prior Publication Data
US 2021/0116297 A1    Apr. 22, 2021

(30) Foreign Application Priority Data
Feb. 28, 2017    (JP) .............................. JP2017-036449

(51) Int. Cl.
*G01J 3/02*    (2006.01)
*G02B 19/00*    (2006.01)
*G01J 3/26*    (2006.01)

(52) U.S. Cl.
CPC .......... *G01J 3/0208* (2013.01); *G01J 3/0202* (2013.01); *G01J 3/0237* (2013.01); *G01J 3/26* (2013.01); *G02B 19/0076* (2013.01)

(58) Field of Classification Search
CPC .......... G01J 3/0208; G01J 3/26; G01J 3/0202; G01J 3/0237; G01J 3/02; G01J 1/04;
(Continued)

(56) References Cited
U.S. PATENT DOCUMENTS
2011/0279824 A1\*  11/2011  Blomberg ............ G02B 26/001
356/519

FOREIGN PATENT DOCUMENTS
CN    105339829 A    2/2016
EP    3018521 A1    5/2016
(Continued)

OTHER PUBLICATIONS
International Preliminary Report on Patentability dated Sep. 12, 2019 for PCT/JP2018/06969.

*Primary Examiner* — Abdullahi Nur
(74) *Attorney, Agent, or Firm* — Faegre Drinker Biddle & Reath LLP

(57) ABSTRACT

A light detection device includes a package including a window, a Fabry-Perot interference filter for transmitting light incident from the window in the package, and a light detector for detecting the light transmitted by the Fabry-Perot interference filter in the package. The Fabry-Perot interference filter includes: a substrate having a first surface on the window side and a second surface on the light detector side; a first layer structure arranged on the first surface, the first layer structure having a first mirror and a second mirror; and a lens unit integrally formed on the
(Continued)

second surface side, the lens unit for condensing the light transmitted by the first mirror and the second mirror onto the light detector.

10 Claims, 16 Drawing Sheets

(58) Field of Classification Search
CPC ......... G01J 3/45; G02B 19/0076; G02B 5/28; G02B 26/00
See application file for complete search history.

(56) References Cited

FOREIGN PATENT DOCUMENTS

| | | |
|---|---|---|
| JP | 2011-205088 A | 10/2011 |
| JP | 2013-24745 A | 2/2013 |
| JP | 2015-031649 A | 2/2015 |
| JP | 2016-31295 A | 3/2016 |
| JP | 2016-211860 A | 12/2016 |
| WO | WO-93/09422 A1 | 5/1993 |
| WO | WO 2016/175089 A1 | 11/2016 |

* cited by examiner

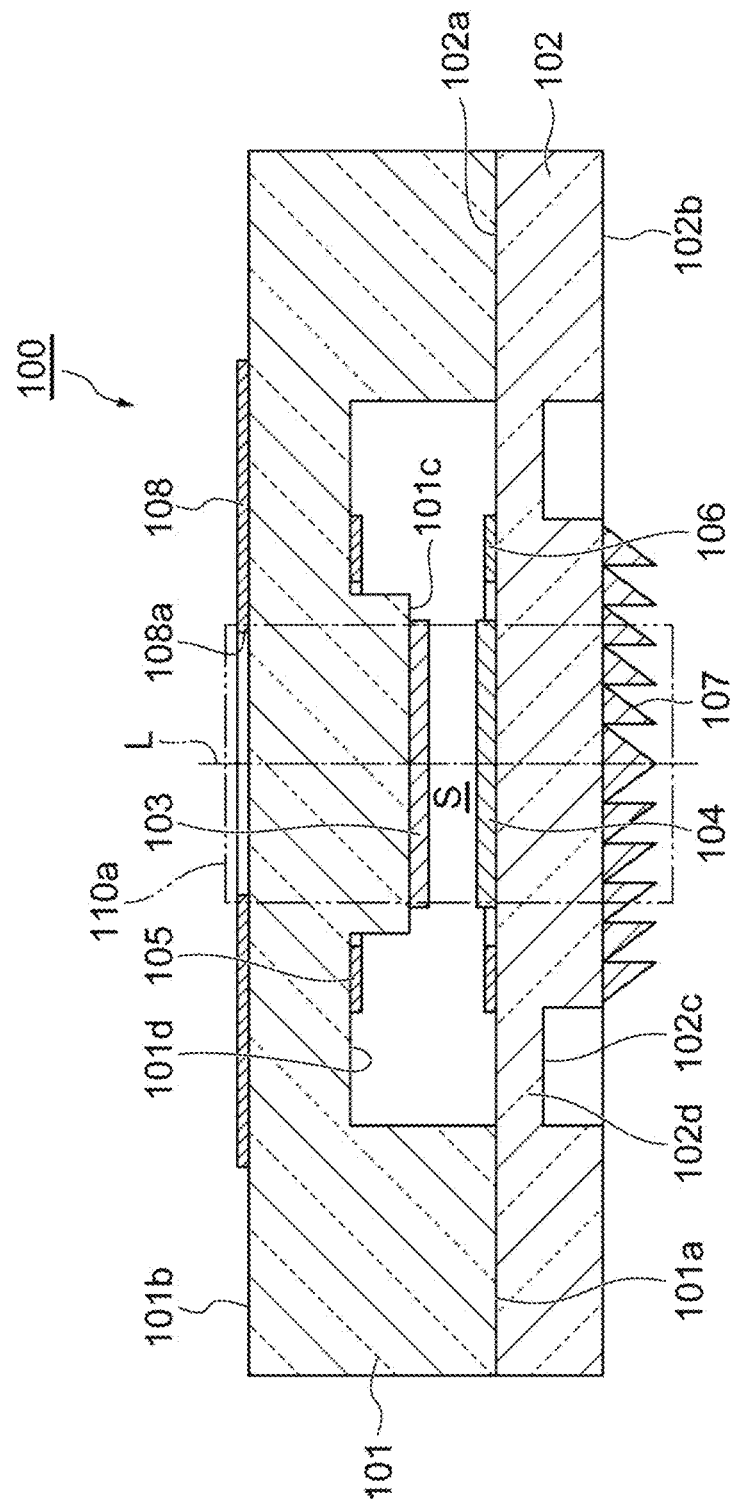

LIGHT DETECTION DEVICE

TECHNICAL FIELD

The present disclosure relates to a light detection device including a Fabry-Perot interference filter.

BACKGROUND ART

Known are light detection devices including a package including a window, a Fabry-Perot interference filter for transmitting light incident from the window in the package, and a light detector for detecting the light transmitted by the Fabry-Perot interference filter in the package (see, for example, Patent Literature 1).

CITATION LIST

Patent Literature

Patent Literature 1: Japanese Unexamined Patent Publication No. 2016-211860

SUMMARY OF INVENTION

Technical Problem

In light detection devices as described above, it is desirable that light transmitted by the Fabry-Perot interference filter be efficiently detected by the light detector. In particular, in the case of analysis of reflected light from a subject to be measured using a general-purpose light source, it is important to efficiently detect the light since the amount of the reflected light tends to be small.

In order to detect light efficiently, it is conceivable to use a light detector such as a photodiode having a wide light receiving region. However, using a light detector with a wide light receiving region may disadvantageously increase noise components in the signal output from the light detector.

An object of the present disclosure is to provide a light detection device capable of highly sensitive and highly accurate detection.

Solution to Problem

A light detection device according to one aspect includes: a package including a window configured to allow light to enter therefrom; a Fabry-Perot interference filter arranged in the package and configured to transmit the light incident from the window; and a light detector arranged in the package in a state of being separated from the Fabry-Perot interference filter, the light detector configured to detect the light transmitted by the Fabry-Perot interference filter, in which the Fabry-Perot interference filter includes: a substrate having a first surface on the window side and a second surface on the light detector side; a first layer structure arranged on the first surface, the first layer structure having a first mirror and a second mirror facing each other via a gap, a distance between the first mirror and the second mirror being variable; and a lens unit integrally formed on the second surface side and configured to condense the light transmitted by the first mirror and the second mirror onto the light detector.

In the light detection device described above, the Fabry-Perot interference filter includes the lens unit that condenses the light transmitted by the first mirror and the second mirror onto the light detector. This arrangement allows the light transmitted by the first mirror and the second mirror to enter the light receiving region efficiently even in a case where a light detector having a small light receiving region is used. That is, it is possible to efficiently detect the light transmitted by the Fabry-Perot interference filter using the light detector having a small light receiving region while the noise component in a signal output from the light detector is reduced. In a case where a light receiving region of a light detector is small, high accuracy is required for the position of the lens unit with respect to the light detector (in particular, the position in a direction perpendicular to the optical axis). Since the lens unit is positioned posterior to the first mirror and the second mirror in the above-described light detection device, the distance between the lens unit and the light detector becomes smaller as compared to the case where the lens unit is positioned anterior to the first mirror and the second mirror, and thus the required accuracy for the position of the lens unit relative to the light detector is relaxed. In addition, since the lens unit is integrally formed on the second surface side of the substrate included in the Fabry-Perot interference filter, the position of the lens unit is unlikely to be misaligned with respect to the light detector as compared to the case where the lens unit is a separate body from the Fabry-Perot interference filter and is attached to a support member (for example, a support member that supports the Fabry-Perot interference filter in a state where the Fabry-Perot interference filter is separated from the light detector in the package). As described above, the above-described light detection device enables highly sensitive and highly accurate detection.

In one aspect of the light detection device, the lens unit may be formed on a portion of the substrate on the second surface side. Since there is no interface between the substrate and the lens unit in this configuration, optical loss can be suppressed, and peeling of the lens unit can be also prevented. Moreover, in a semiconductor manufacturing process, the lens unit can be easily formed with high positional accuracy.

In one aspect of the light detection device, the lens unit may be formed directly or indirectly on the second surface. According to this configuration, the stress balance of the Fabry-Perot interference filter can be improved as compared with the case where the lens unit is formed on a portion of the substrate. In addition, this configuration can increase the degree of freedom as to the shape (such as the curvature of a lens surface) of the lens unit.

In one aspect of the light detection device, the Fabry-Perot interference filter may further include a second layer structure arranged on the second surface and structured to correspond to the first layer structure. An opening may be formed in the second layer structure to allow light transmitted by the first mirror and the second mirror to pass therethrough, and the lens unit may be arranged in the opening. This configuration can suppress misalignment of the position of the lens unit even in a case where the lens unit is a separate body from the substrate. In addition, this can improve the light collecting function of the lens unit while the thickness of the Fabry-Perot interference filter is suppressed from increasing, for example by increasing the thickness of the lens unit by the amount by which the lens unit is arranged in the opening. Moreover, disposing the entire lens unit in the opening can prevent damage and contamination of the lens unit.

In one aspect of the light detection device, the Fabry-Perot interference filter may further include a second layer structure arranged on the second surface and structured to correspond to the first layer structure. An opening may be formed in the second layer structure to allow light transmitted by the first mirror and the second mirror to pass therethrough, and the lens unit may be arranged in the opening, and the lens unit may be attached to the second layer structure so as to close the opening. This configuration can improve the stress balance between the first surface side and the second surface side of the substrate in the Fabry-Perot interference filter. In addition, this configuration can increase the degree of freedom as to the shape (such as the curvature of a lens surface) of the lens unit 50.

In one aspect of the light detection device, the perimeter of the lens unit is positioned inside the perimeter of the window when viewed from the incident direction of light and positioned outside the perimeter of the light receiving region of the light detector. This arrangement allows light transmitted by the first mirror and the second mirror to enter the light receiving region of the light detector efficiently.

Advantageous Effects of Invention

According to the present disclosure, it is possible to provide a light detection device capable of highly sensitive and highly accurate detection.

BRIEF DESCRIPTION OF DRAWINGS

FIG. 16 is a cross-sectional view of a reference example of a Fabry-Perot interference filter.

DESCRIPTION OF EMBODIMENTS

Hereinafter, embodiments of the present disclosure will be described in detail with reference to the drawings. Note that the same or corresponding parts in the respective drawings are denoted with the same symbol, and overlapping descriptions are omitted.

First Embodiment

[Configuration of Light Detection Device]

Figure 1:
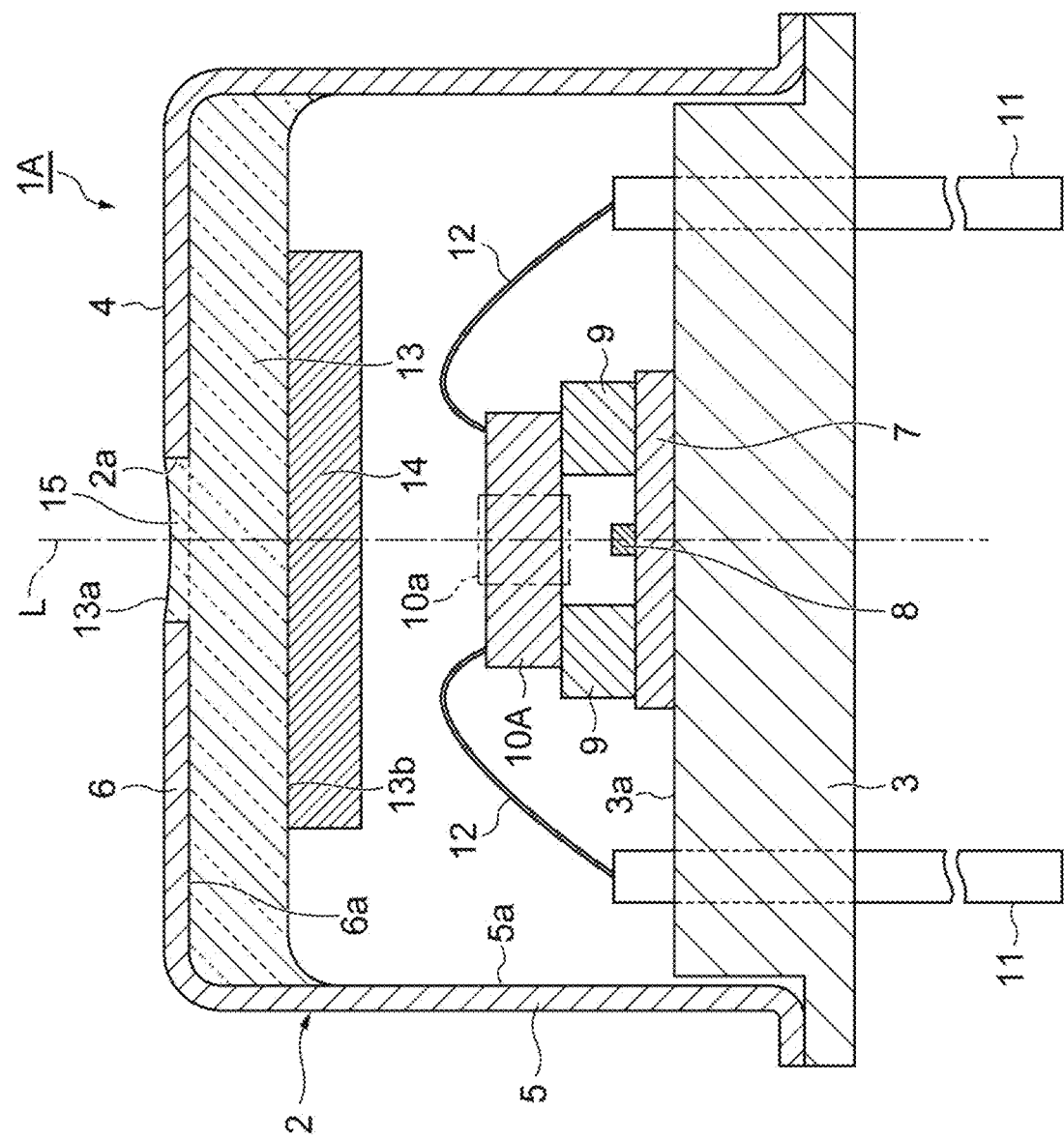
FIG. 1 is a cross-sectional view of a light detection device of a first embodiment.

As illustrated in FIG. 1, a light detection device 1A includes a package 2. The package 2 is a CAN package including a stem 3 and a cap 4. A side wall 5 and a top wall 6 integrally form the cap 4. The top wall 6 faces the stem 3 in a direction parallel to line L. The stem 3 and the cap 4 are made of metal, for example, and are airtightly joined to each other.

A wiring substrate 7 is secured on an inner surface 3a of the stem 3 by, for example, an adhesive agent. As a material of the wiring substrate 7, for example, silicon, ceramic, quartz, glass, plastic, or the like can be used. A light detector 8 and a temperature compensating element (not illustrated) such as a thermistor are mounted on the wiring substrate 7. The light detector 8 is arranged on line L in the package 2. More specifically, the light detector 8 is arranged in the package 2 such that the center line of a light receiving region thereof coincides with line L. The light detector 8 is an infrared detector such as a quantum type sensor using InGaAs or other compounds or a thermal type sensor using a thermopile or a bolometer or the like. In a case where light of different wavelength regions of ultraviolet, visible, and near infrared regions, for example a silicon photodiode or the like can be used as the light detector 8. Note that the light receiving region of the light detector 8 may include one light receiving unit, or may include a plurality of light receiving units. Examples of the light detector 8 having a light receiving region including a plurality of light receiving units include a photodiode array, a CCD image sensor, a CMOS image sensor, and the like. Furthermore, a plurality of light detectors 8 may be mounted on the wiring substrate 7. In this case, a set of light receiving units of the plurality of light detectors 8 can be regarded as the light receiving region.

A plurality of spacers (supports) 9 is secured on the wiring substrate 7 by, for example, an adhesive agent. The plurality of spacers 9 are arranged in the package 2 so as to sandwich or surround the light detector 8 and the temperature compensating element. As a material of the spacers 9, for example, silicon, ceramic, quartz, glass, plastic, or the like can be used. On the plurality of spacers 9, a Fabry-Perot interference filter 10A is secured by an adhesive agent, for example. The Fabry-Perot interference filter 10A is arranged on line L in the package 2. More specifically, the Fabry-Perot interference filter 10A is arranged in the package 2 such that the center line of a light transmission region 10a thereof coincides with line L. The spacers 9 supports the Fabry-Perot interference filter 10A in a state where the Fabry-Perot interference filter 10A is separated away from the light detector 8 (that is, in a state where a space is formed between the Fabry-Perot interference filter 10A and the light detector 8). That is, the Fabry-Perot interference filter 10A and the light detector 8 are arranged in the package 2 while separated from each other. Note that the spacers 9 may be integrally formed with the wiring substrate 7. The Fabry-Perot interference filter 10A may be supported not by the plurality of spacers 9 but by a single spacer 9. Alternatively, the spacers 9 may be formed integrally with the Fabry-Perot interference filter 10A.

A plurality of lead pins 11 is secured to the stem 3. More specifically, each of the lead pins 11 penetrates through the stem 3 in a state where electrical insulation and airtightness with the stem 3 are maintained. Each of the lead pins 11 is electrically connected with an electrode pad provided to the wiring substrate 7, a terminal of the light detector 8, a terminal of the temperature compensating element, and a terminal of the Fabry-Perot interference filter 10A by a wire 12. This enables input and output of electric signals to and from each of the light detector 8, the temperature compensating element, and the Fabry-Perot interference filter 10A. Note that a lead pin 11 and an electrode pad on the wiring substrate 7 electrically connected with the light detector 8 may be electrically connected by a wire 12.

An opening 2*a* is formed in the package 2. More specifically, the opening 2*a* is formed in the top wall 6 of the cap 4 such that the center line thereof coincides with line L. On an inner surface 6*a* of the top wall 6, a light transmitting member 13 is arranged so as to close the opening 2*a*. The light transmitting member 13 spreads inside the opening 2*a* and to the inner surface 5*a* of the side wall 5 to seal the opening 2*a* in an airtight manner. The light transmitting member 13 transmits light at least in a range of measurement wavelengths of the light detection device 1A. A light incident surface 13*a* of the light transmitting member 13 is substantially flush with an outer surface of the top wall 6 at the opening 2*a*. Such a light transmitting member 13 is formed by arranging a glass pellet inside the cap 4 with the opening 2*a* facing down and melting the glass pellet. That is, the light transmitting member 13 is made of fused glass. In the package 2, a portion of the light transmitting member 13 positioned in the opening 2*a* functions as a window 15 that allows light to enter the package 2 from the outside. Note that a plate-like light transmitting member 13 made of, for example, glass, quartz, silicon, germanium, plastic, or the like may be airtightly secured to the inner surface 6*a* of the top wall 6 so as to close the opening 2*a*. In this case, the region in the opening 2*a* functions as the window 15. That is, regardless of the presence of the light transmitting member 13, the region in the opening 2*a* functions as the window 15. The light transmitting member 13 may be airtightly joined to the inner surface 6*a* of the top wall 6 by an adhesive agent made of resin or the like.

A plate-like band pass filter 14 is secured on the light emitting surface 13*b* of the light transmitting member 13 (a surface facing the light incident surface 13*a* in a direction parallel to line L) by, for example, an adhesive agent. The band pass filter 14 selectively transmits light in a range of measurement wavelengths of the light detection device 1A. The band pass filter 14 includes a dielectric multilayer film formed by a combination of a high refractive material such as $TiO_2$ and $Ta_2O_5$ and a low refractive material such as $SiO_2$ and $MgF_2$. Note that the band pass filter 14 may be formed on the light emitting surface 13*b* of the light transmitting member 13 by, for example, vapor deposition. In addition, the light transmitting member 13 itself may have the function of a band pass filter.

Figure 2:
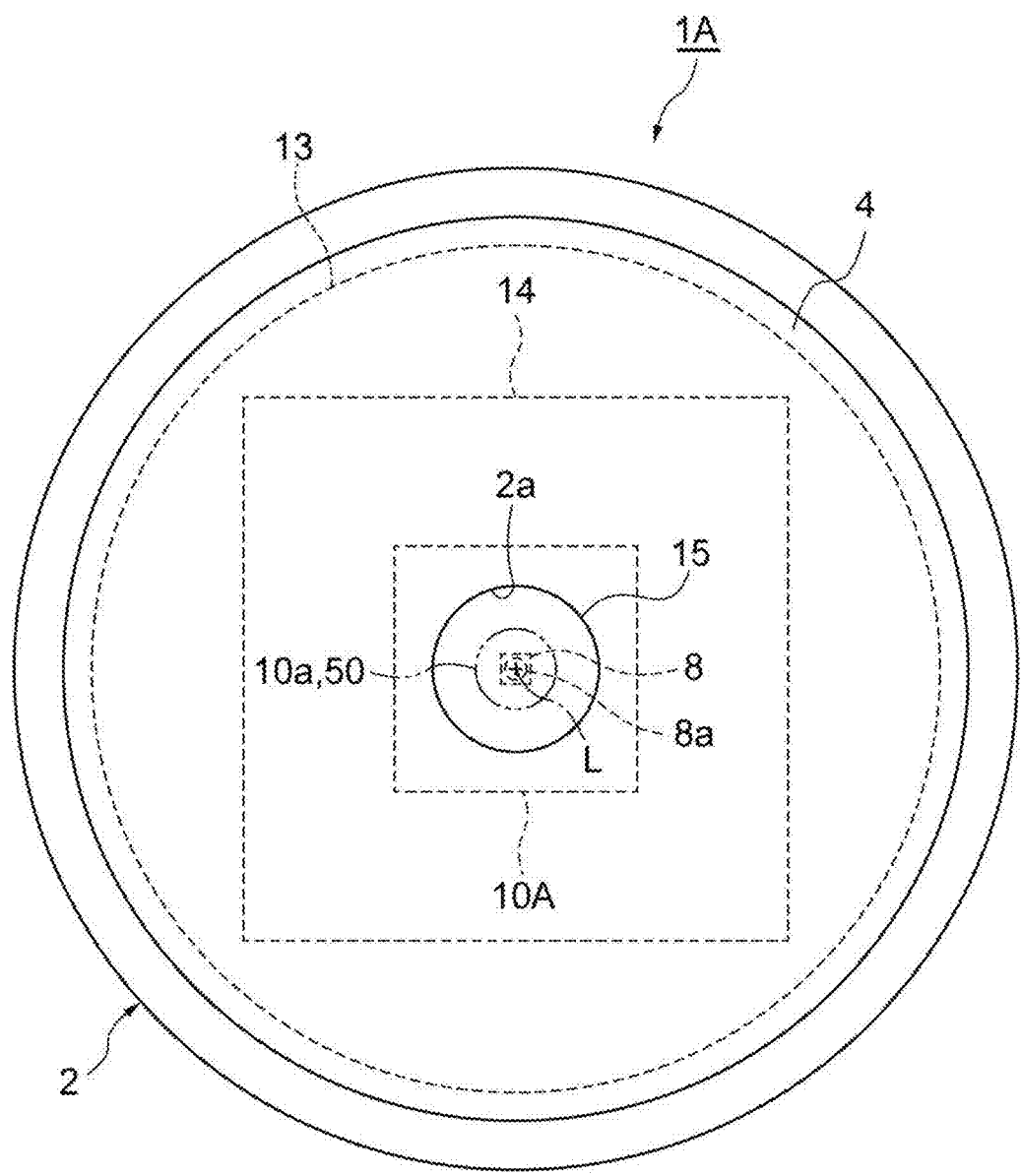
FIG. 2 is a plan view of the light detection device illustrated in FIG. 1.

The positional relationship and magnitude relationship of the respective components when viewed from the direction parallel to line L (incident direction of light with respective to the window 15) are as follows. As illustrated in FIG. 2, the center line of the window 15 (that is, the center line of the opening 2*a*), the center line of the light transmitting member 13, the center line of the band pass filter 14, the center line of the light transmission region 10*a* of the Fabry-Perot interference filter 10A, and the center line of the light receiving region 8*a* of the light detector 8 coincides with line L. The perimeter of the window 15, the perimeter of the light transmitting member 13, the perimeter of the light transmission region 10*a*, and the perimeter of the light receiving region 8*a* are, for example, circular. The perimeter of the band pass filter 14, the perimeter of the Fabry-Perot interference filter 10A, and the perimeter of the light detector 8 are, for example, rectangular.

The perimeter of the window 15 (i.e., the inner perimeter of the opening 2*a*) is positioned inside the perimeter of the light transmitting member 13, the perimeter of the band pass filter 14, and the perimeter of the Fabry-Perot interference filter 10A and is positioned outside the perimeter of the light transmission region 10*a* and the perimeter of the light receiving region 8*a*. The perimeter of the light receiving region 8*a* is positioned inside the perimeter of the light transmission region 10*a*. The perimeter of the band pass filter 14 is positioned inside the perimeter of the light transmitting member 13 and is positioned outside the perimeter of the Fabry-Perot interference filter 10A. Note that "a perimeter is positioned inside another perimeter when viewed from a predetermined direction" means that "the other perimeter surrounds the perimeter when viewed from the predetermined direction" or that "the other perimeter includes the perimeter when viewed from the predetermined direction." In addition, "a perimeter is positioned outside another perimeter when viewed from a predetermined direction" means that "the perimeter surrounds the other perimeter when viewed from the predetermined direction" or that "the perimeter includes the other perimeter when viewed from the predetermined direction."

In the light detection device 1A configured as described above, when light enters the light transmission region 10*a* of the Fabry-Perot interference filter 10A from the outside via the window 15, the light transmitting member 13, and the band pass filter 14, light having a predetermined wavelength is selectively transmitted. The light transmitted by the light transmission region 10*a* of the Fabry-Perot interference filter 10A enters the light receiving region 8*a* of the light detector 8 and is detected by the light detector 8.

[Configuration of Fabry-Perot Interference Filter]

Figure 3:
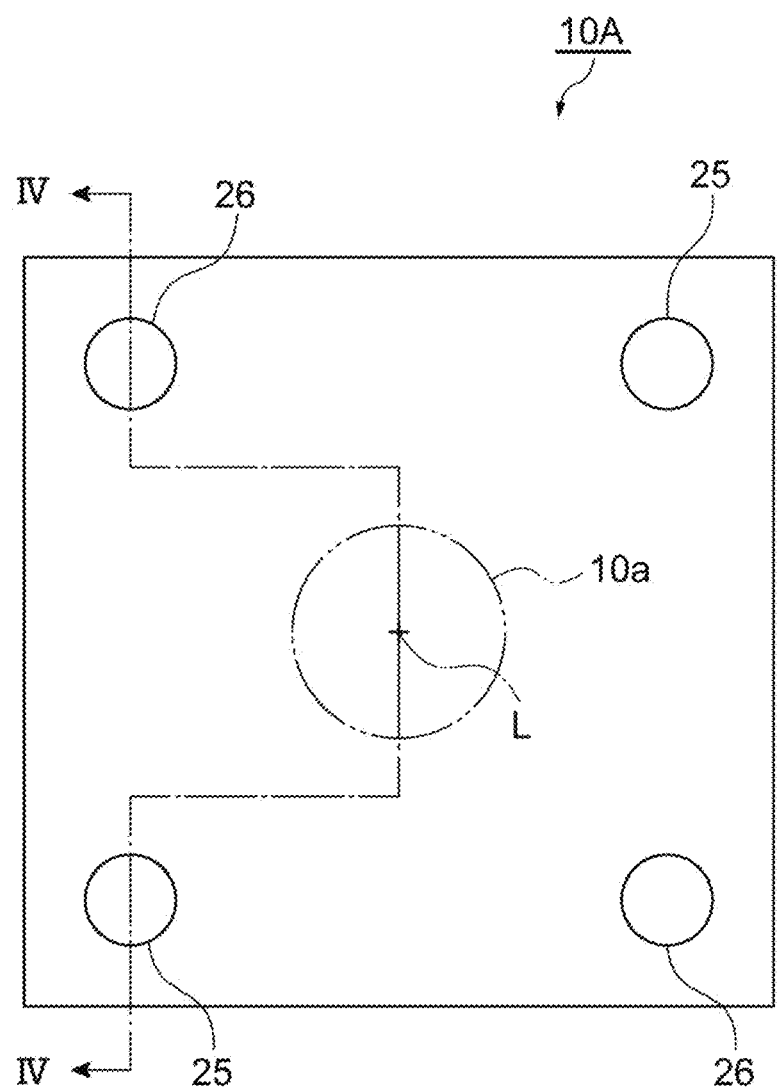
FIG. 3 is a plan view of a Fabry-Perot interference filter of the light detection device illustrated in FIG. 1.
Figure 4:
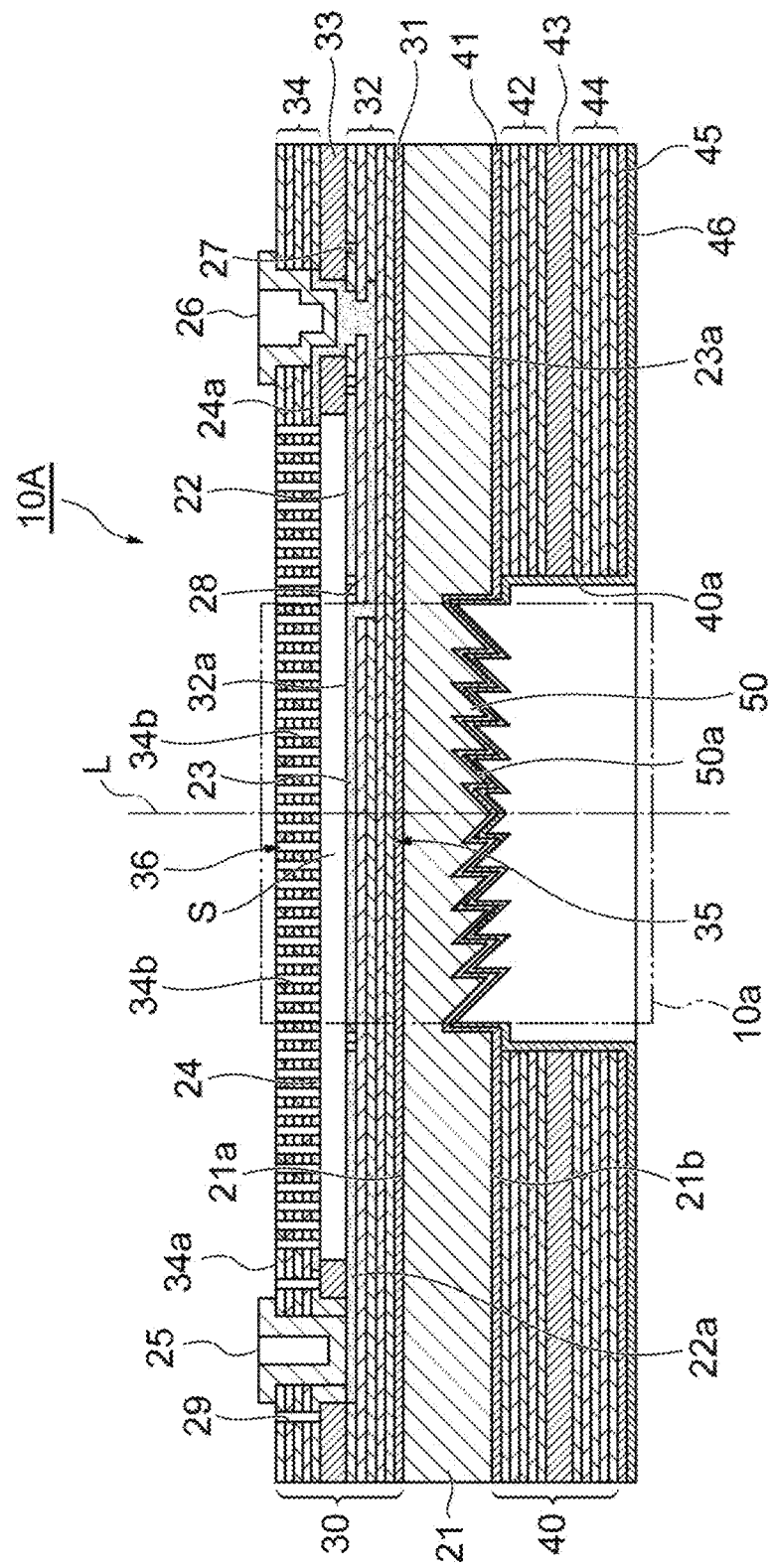
FIG. 4 is a cross-sectional view of the Fabry-Perot interference filter taken along line IV-IV illustrated in FIG. 3.

As illustrated in FIGS. 3 and 4, in the Fabry-Perot interference filter 10A, the light transmission region 10*a* that transmits light corresponding to a distance between a first mirror and a second mirror is included on line L. The light transmission region 10*a* is, for example, a cylindrical region. In the light transmission region 10*a*, the distance between the first mirror and the second mirror is controlled with extremely high accuracy. That is, the light transmission region 10*a* is a region in the Fabry-Perot interference filter 10A in which the distance between the first mirror and the second mirror can be controlled to a predetermined distance in order to allow selectively transmission of light having a predetermined wavelength and is a region through which light having a predetermined wavelength corresponding to the distance between the first mirror and the second mirror can be transmitted.

The Fabry-Perot interference filter 10A includes a rectangular plate-shaped substrate 21. The substrate 21 has a first surface 21*a* and a second surface 21*b* facing each other in a direction parallel to line L. The first surface 21*a* is a surface on the window 15 side (that is, the light incidence side). The second surface 21*b* is a surface on the light detector 8 side (that is, the light emission side). A first layer structure 30 is arranged on the first surface 21*a*. A second layer structure 40 is arranged on the second surface 21*b*.

The first layer structure 30 includes a first antireflection layer 31, a first laminated body 32, the first intermediate layer 33, and a second laminated body 34 laminated on the first surface 21*a* in the order mentioned. A gap (air gap) S is formed between the first laminated body 32 and the second laminated body 34 by the first intermediate layer 33 of a frame shape. The substrate 21 is made of, for example, silicon, quartz, glass, or the like. In a case where the substrate 21 is made of silicon, the first antireflection layer 31 and the first intermediate layer 33 are made of, for example, silicon oxide. The thickness of the first intermediate layer 33 is, for example, several tens nanometers to several tens micrometers.

A part of the first laminated body 32 corresponding to the light transmission region 10a functions as a first mirror 35. The first laminated body 32 includes a plurality of polysilicon layers and a plurality of silicon nitride layers with each of the plurality of layers laminated alternately. The optical thickness of each of the polysilicon layers and the silicon nitride layers forming the first mirror 35 is preferably an integral multiple of a quarter of the central transmission wavelength. The first mirror 35 may be arranged directly on the first surface 21a without the first antireflection layer 31 interposed therebetween.

A part of the second laminated body 34 corresponding to the light transmission region 10a functions as a second mirror 36. The second mirror 36 faces the first mirror 35 via the gap S in the direction parallel to line L. The second laminated body 34 includes a plurality of polysilicon layers and a plurality of silicon nitride layers with each of the plurality of layers laminated alternately. The optical thickness of each of the polysilicon layers and the silicon nitride layers forming the second mirror 36 is preferably an integral multiple of a quarter of the central transmission wavelength.

In the first laminated body 32 and the second laminated body 34, silicon oxide layers may be arranged instead of the silicon nitride layers. Other than the materials described above, titanium oxide, tantalum oxide, zirconium oxide, magnesium fluoride, aluminum oxide, calcium fluoride, silicon, Germanium, zinc sulfide, and the like may be used as the material of each layer included in the first laminated body 32 and the second laminated body 34.

A plurality of through holes 34b extending from the surface 34a of the second laminated body 34 on the side opposite to the first intermediate layer 33 to the gap S is formed in a portion of the second laminated body 34 corresponding to the gap S. The plurality of through holes 34b is formed such that there is substantially no impact on the function of the second mirror 36. The plurality of through holes 34b has been used to form the gap S by removal of a part of the first intermediate layer 33 by etching.

A first electrode 22 is formed in the first mirror 35 so as to surround the light transmission region 10a. A second electrode 23 is formed in the first mirror 35 so as to include the light transmission region 10a. The first electrode 22 and the second electrode 23 are formed by doping a polysilicon layer closest to the gap S in the first laminated body 32 with an impurity to reduce the resistance. A third electrode 24 is formed in the second mirror 36. The third electrode 24 faces the first electrode 22 and the second electrode 23 via the gap S in a direction parallel to line L. The third electrode 24 is fainted by doping a polysilicon layer closest to the gap S in the second laminated body 34 with an impurity to reduce the resistance. Note that although it is preferable that the second electrode 23 is sized to include the entire light transmission region 10a, the second electrode 23 may have substantially the same size as that of the light transmission region 10a.

The first layer structure 30 is provided with a pair of first terminals 25 and a pair of second terminals 26. The pair of first terminals 25 face each other across the light transmission region 10a. Each of the first terminals 25 is arranged in a through hole extending from the surface 34a of the second laminated body 34 to the first laminated body 32. Each of the first terminals 25 is electrically connected with the first electrode 22 via wiring 22a. The pair of second terminals 26 face to each other across the light transmission region 10a in a direction perpendicular to the direction in which the pair of first terminals 25 face each other. Each of the second terminals 26 is arranged in a through hole extending from the surface 34a of the second laminated body 34 to the inside of the first intermediate layer 33. Each of the second terminals 26 is electrically connected with the second electrode 23 via wiring 23a and is also electrically connected with the third electrode 24 via wiring 24a.

Trenches 27 and 28 are formed on the surface 32a of the first laminated body 32 on the first intermediate layer 33 side. The trench 27 extends annularly so as to surround a connecting part of the wiring 23a with the second terminal 26. The trench 27 electrically insulates the first electrode 22 from the wiring 23a. A trench 28 annularly extends along the inner perimeter of the first electrode 22. The trench 28 electrically insulates the first electrode 22 from the region inside the first electrode 22 (that is, the region where the second electrode 23 is). Trenches 29 are formed on the surface 34a of the second laminated body 34. A trench 29 annularly extends so as to surround a first terminal 25. The trench 29 electrically insulates the first terminal 25 from the third electrode 24. Regions inside the trenches 27, 28, and 29 may include an insulating material or a gap.

The second layer structure 40 includes a second antireflection layer 41, a third laminated body 42, a second intermediate layer 43, and a fourth laminated body 44 laminated on the second surface 21b in the order mentioned. The second antireflection layer 41, the third laminated body 42, the second intermediate layer 43, and the fourth laminated body 44 have similar configurations to those of the first antireflection layer 31, the first laminated body 32, the first intermediate layer 33, and the second laminated body 34, respectively. In this manner, the second layer structure 40 has a laminate structure symmetrical to the first layer structure 30 with respect to the substrate 21. That is, the second layer structure 40 is structured to correspond to the first layer structure 30. The second layer structure 40 has a function to suppress warpage or the like of the substrate 21.

An opening 40a is formed in the third laminated body 42, the second intermediate layer 43, and the fourth laminated body 44 so as to include the light transmission region 10a. The center line of the opening 40a coincides with line L. The opening 40a is, for example, a cylindrical space, and has a diameter substantially the same as that of the light transmission region 10a. The opening 40a opens on the light emission side, and the bottom surface of the opening 40a extends to the second antireflection layer 41. The opening 40a passes light transmitted by the first mirror 35 and the second mirror 36. The third laminated body 42 may be arranged directly on the second surface 21b without interposing the second antireflection layer 41 therebetween.

A light shielding layer 45 is formed on a surface of the fourth laminated body 44 on the light emission side. The light shielding layer 45 is made of, for example, aluminum. A protective layer 46 is formed on the surface of the light shielding layer 45 and the inner surface of the opening 40a. The protective layer 46 is made of, for example, aluminum oxide. Note that, by setting the thickness of the protective layer 46 at 1 to 100 nm (preferably, about 30 nm), optical influence by the protective layer 46 becomes negligible. The protective layer 46 may be omitted.

A lens unit 50 is integrally formed on the second surface 21b side of the substrate 21. The lens unit 50 is formed on a portion of the substrate 21 on the second surface 21b side. A light emitting surface 50a of the lens unit 50 includes a part of the second surface 21b. The center line of the lens unit 50 (that is, the center line of the light emitting surface 50a) coincides with line L. When viewed from a direction parallel to line L, the perimeter of the lens unit 50 is positioned inside the perimeter of the window 15 of the package 2 and is positioned outside the perimeter of the light receiving region 8a of the light detector 8 (see FIG. 2). In this example, the lens unit 50 has a diameter substantially the same as that of the light transmission region 10a. The light emitting surface 50a is covered with the second anti-reflection layer 41 and the protective layer 46 at the bottom surface of the opening 40a. The lens unit 50 condenses light transmitted by the first mirror 35 and the second mirror 36 onto the light receiving region 8a of the light detector 8.

The lens unit 50 is formed as a Fresnel lens. As an example, the diameter of the lens unit 50 is about 750 μm, and in the case where the substrate 21 is made of silicon, the refractive index of the lens unit 50 is 3.5. The number of circles of the Fresnel lens is three to 60, the height of the ruggedness is 1 to 25 μm, and the interval between circles is 5 to 150 μm. Such a lens unit 50 is formed by forming a resist pattern on the second surface 21b of the substrate 21 using a 3D mask or the like and performing an etchback.

Figure 5:
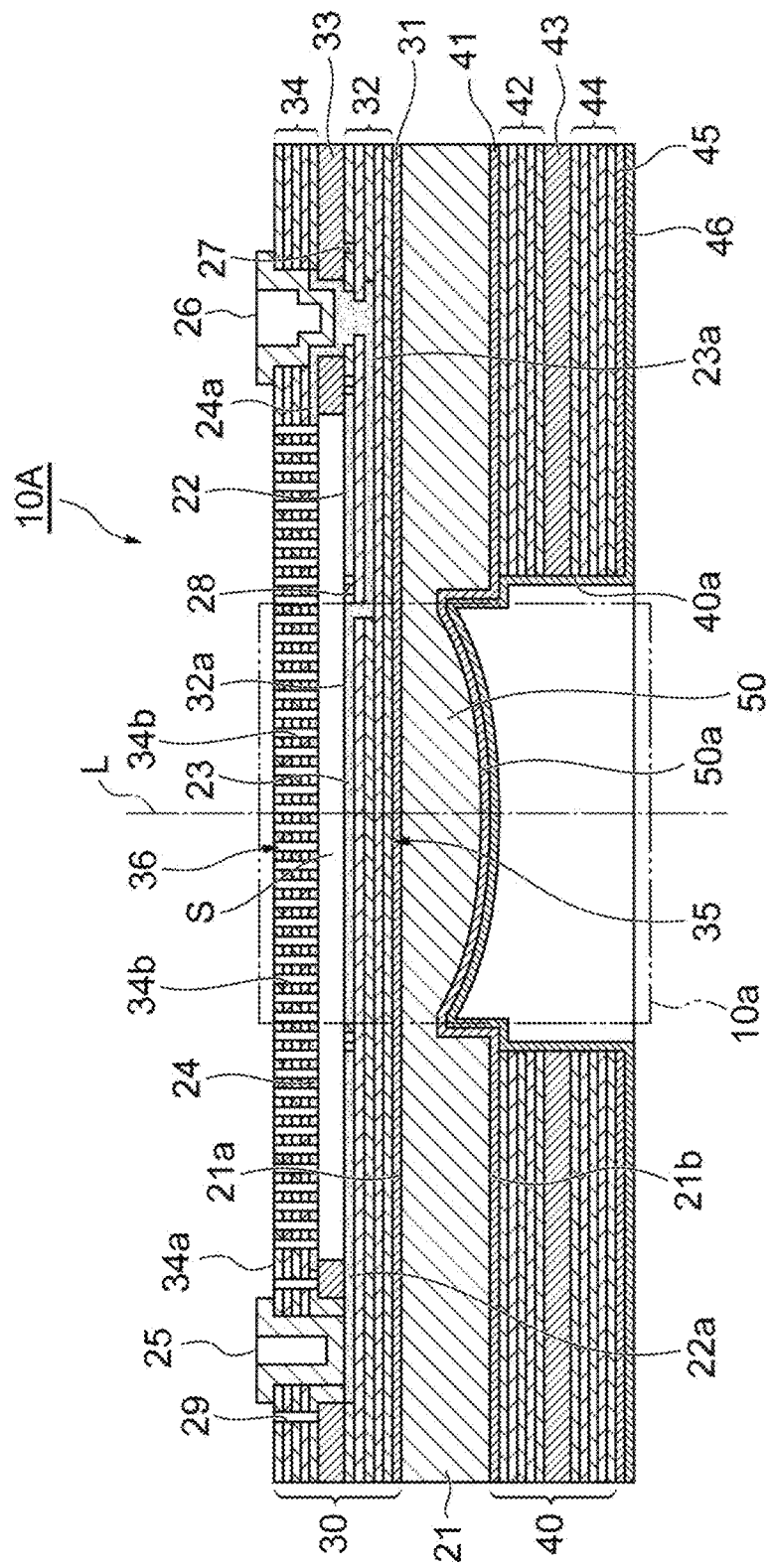
FIG. 5 is a cross-sectional view of a modification of the Fabry-Perot interference filter illustrated in FIG. 4.

Note that the lens unit 50 may be formed as a convex lens having the light emitting surface 50a convex toward the light emission side as illustrated in FIG. 5. As an example, the diameter of the lens unit 50 is about 750 μm, and in the case where the substrate 21 is made of silicon, the refractive index of the lens unit 50 is 3.5. The height of the light emitting surface 50a convex toward the light emission side is 60 to 80 μm. Such a lens unit 50 is formed by forming a resist pattern on the second surface 21b of the substrate 21 using a 3D mask or the like and performing an etchback.

In the Fabry-Perot interference filter 10A configured in the above manner, when a voltage is applied between the first electrode 22 and the third electrode 24 via the pair of first terminals 25 and the pair of second terminals 26, electrostatic force corresponding to the voltage is generated between the first electrode 22 and the third electrode 24. The second mirror 36 is pulled toward the first mirror 35 secured to the substrate 21 by the electrostatic force, thereby adjusting the distance between the first mirror 35 and the second mirror 36. As described above, the distance between the first mirror 35 and the second mirror 36 is variable in the Fabry-Perot interference filter 10A.

The wavelength of light transmitted by the Fabry-Perot interference filter 10A is dependent on the distance between the first mirror 35 and the second mirror 36 in the light transmission region 10a. Therefore, adjusting the voltage applied between the first electrode 22 and the third electrode 24 allows a wavelength of transmitted light to be selected as appropriate. Here, the second electrode 23 has the same potential as that of the third electrode 24. Therefore, the second electrode 23 functions as a compensation electrode for keeping the first mirror 35 and the second mirror 36 flat in the light transmission region 10a.

In the light detection device 1A, an optical spectrum can be obtained by detection of light transmitted by the light transmission region 10a of the Fabry-Perot interference filter 10A by the light detector 8 while the voltage applied to the Fabry-Perot interference filter 10A is changed (that is, while the distance between the first mirror 35 and the second mirror 36 in the Fabry-Perot interference filter 10A is changed). In the Fabry-Perot interference filter 10A then, the light transmitted by the first mirror 35 and the second mirror 36 is condensed by the lens unit 50 onto the light receiving region 8a of the light detector 8.

Note that, in the Fabry-Perot interference filter 10A, the light transmission region 10a (as described above, a region in the Fabry-Perot interference filter 10A in which the distance between the first mirror 35 and the second mirror 36 for selectively transmitting light having a predetermined wavelength can be controlled to a predetermined distance and through which light having a predetermined wavelength corresponding to the distance between the first mirror 35 and the second mirror 36 can be transmitted) can be regarded as a region corresponding to the region inside the first electrode 22 (that is, the region where the second electrode 23 functioning as a compensation electrode is present) when viewed from a direction parallel to line L, or can be regarded as a region corresponding to the opening 40a when viewed from the direction parallel to line L.

[Actions and Effects]

In the light detection device 1A, the Fabry-Perot interference filter 10A includes the lens unit 50 that condenses the light transmitted by the first mirror 35 and the second mirror 36 onto the light detector 8. This arrangement allows the light transmitted by the first mirror 35 and the second mirror 36 to enter the light receiving region 8a efficiently even in the case where the light detector 8 having the small light receiving region 8a is used. That is, it is possible to efficiently detect the light transmitted by the Fabry-Perot interference filter 10A using the light detector 8 having the small light receiving region 8a while the noise component in a signal output from the light detector 8 are reduced. In a case where the light receiving region 8a of the light detector 8 is small, high accuracy is required for the position of the lens unit 50 with respect to the light detector 8 (in particular, the position in a direction perpendicular to the optical axis). Since the lens unit 50 is positioned posterior to the first mirror 35 and the second mirror 36 in the light detection device 1A, the distance between the lens unit 50 and the light detector 8 becomes smaller as compared to the case where the lens unit 50 is positioned anterior to the first mirror 35 and the second mirror 36, and thus the accuracy required for the position of the lens unit 50 relative to the light detector 8 is relaxed. Moreover, since the lens unit 50 is integrally formed on the second surface 21b side of the substrate 21 included in the Fabry-Perot interference filter 10A, the position of the lens unit 50 is unlikely to be misaligned with respect to the light detector 8 as compared to the case where the lens unit 50 is a separate body from the Fabry-Perot interference filter 10A and is attached to the spacers 9. As described above, the light detection device 1A enables highly sensitive and highly accurate detection.

As an example, the case where the diameter of the light transmission region 10a of the Fabry-Perot interference filter 10A is 750 μm and the diameter of the light receiving region 8a of the light detector 8 is 100 μm will be described. In this case, if the lens unit 50 is not formed in the Fabry-Perot interference filter 10A, light transmitted by the light transmission region 10a of the Fabry-Perot interference filter 10A enters the light receiving region 8a of the light detector 8 only within the range of a diameter of 100 μm. That is, only a part of the light transmitted by the light transmission region 10a of the Fabry-Perot interference filter 10A can be used.

On the other hand, when the lens unit 50 is formed in the Fabry-Perot interference filter 10A, substantially all the light transmitted by the light transmission region 10a of the Fabry-Perot interference filter 10A enters the light receiving region 8a of the light detector 8. That is, substantially all the light transmitted by the light transmission region 10a of the Fabry-Perot interference filter 10A can be used. In particular, in the case of analysis of reflected light from a subject to be measured using a general-purpose light source, it is extremely important to efficiently detect the light in the above manner since the amount of the reflected light tends to be small.

When the diameter of the light receiving region 8a of the light detector 8 is 100 μm, however, the position where the light condensed by the lens unit 50 needs an accuracy of ±50 μm or less, which means that similar accuracy is also required for the position of the lens unit 50 with respect to the light receiving region 8a of the light detector 8. In the Fabry-Perot interference filter 10A, such accuracy can be implemented by the lens unit 50 integrally formed on the second surface 21b side of the substrate 21.

Incidentally, it is also possible to enable highly sensitive detection in the light detection device 1A by providing the window 15 of the package 2 a lens function. However, the diameter of the window 15 needs to be sufficiently larger than the diameter of the light transmission region 10a of the Fabry-Perot interference filter 10A, for example 1500 in consideration of the mounting accuracy of the cap 4 to the stem 3. Furthermore, the position of the window 15 with respect to the light receiving region 8a of the light detector 8 needs an accuracy of about +50 μm. Therefore, when active alignment is not performed upon mounting of the cap 4 to the stem 3, light may not enter the light receiving region 8a of the light detector 8. As described above, since the size of the lens unit is increased and active alignment is required, the configuration in which the window 15 has a lens function has little advantage in terms of cost as compared to a configuration in which the lens unit 50 is integrally formed on the second surface 21b side of the substrate 21.

Furthermore, since the lens unit 50 is integrally formed on the second surface 21b side of the substrate 21 included in the Fabry-Perot interference filter 10A in the light detection device 1A, only the alignment with respect to the light detector 8 needs be considered upon mounting the Fabry-Perot interference filter 10A. Therefore, the assembling is significantly facilitated as compared to the case where the lens unit 50 is a separate body from the Fabry-Perot interference filter 10A and is attached to the spacers 9. Furthermore, in the case of manufacturing the Fabry-Perot interference filter 10A at the wafer level in a semiconductor manufacturing process, the lens unit 50 can also be integrally formed on the second surface 21b side of the substrate 21 at the wafer level, which allows the Fabry-Perot interference filter 10A having the small-sized lens unit 50 with high positional accuracy to be easily manufactured.

In the light detection device 1A, the lens unit 50 is formed at a portion of the substrate 21 on the second surface 21b side. Since there is no interface between the substrate 21 and the lens unit 50 in this configuration, optical loss can be suppressed, and peeling of the lens unit 50 can be also prevented. In addition, the lens unit 50 can be easily formed with high positional accuracy in a semiconductor manufacturing process. In the case where the substrate 21 is made of silicon, the refractive index of the lens unit 50 is 3.5. Since the lens unit 50 can be made of a material having a high refractive index, the distance between the light detector 8 and the Fabry-Perot interference filter 10A can be shortened to miniaturize the light detection device 1A. Furthermore, since the light emitting surface 50a of the lens unit 50 is positioned at the bottom surface of the opening 40a, damage and contamination of the light emitting surface 50a can be prevented.

The perimeter of the lens unit 50 is positioned inside the perimeter of the window 15 when viewed from the incident direction of light and positioned outside the perimeter of the light receiving region 8a of the light detector 8 in the light detection device 1A. This arrangement allows light transmitted by the first mirror 35 and the second mirror 36 to enter the light receiving region 8a of the light detector 8 efficiently. For example, in the configuration in which a lens is integrally formed on the light receiving region 8a of the light detector 8, it is difficult to obtain such an effect. Integrally forming, on the Fabry-Perot interference filter 10A, the lens unit 50 having a size equivalent to or larger than that of the light transmission region 10a of the Fabry-Perot interference filter 10A can maximize the detection efficiency of light transmitted by the Fabry-Perot interference filter 10A.

Second Embodiment

Figure 6:
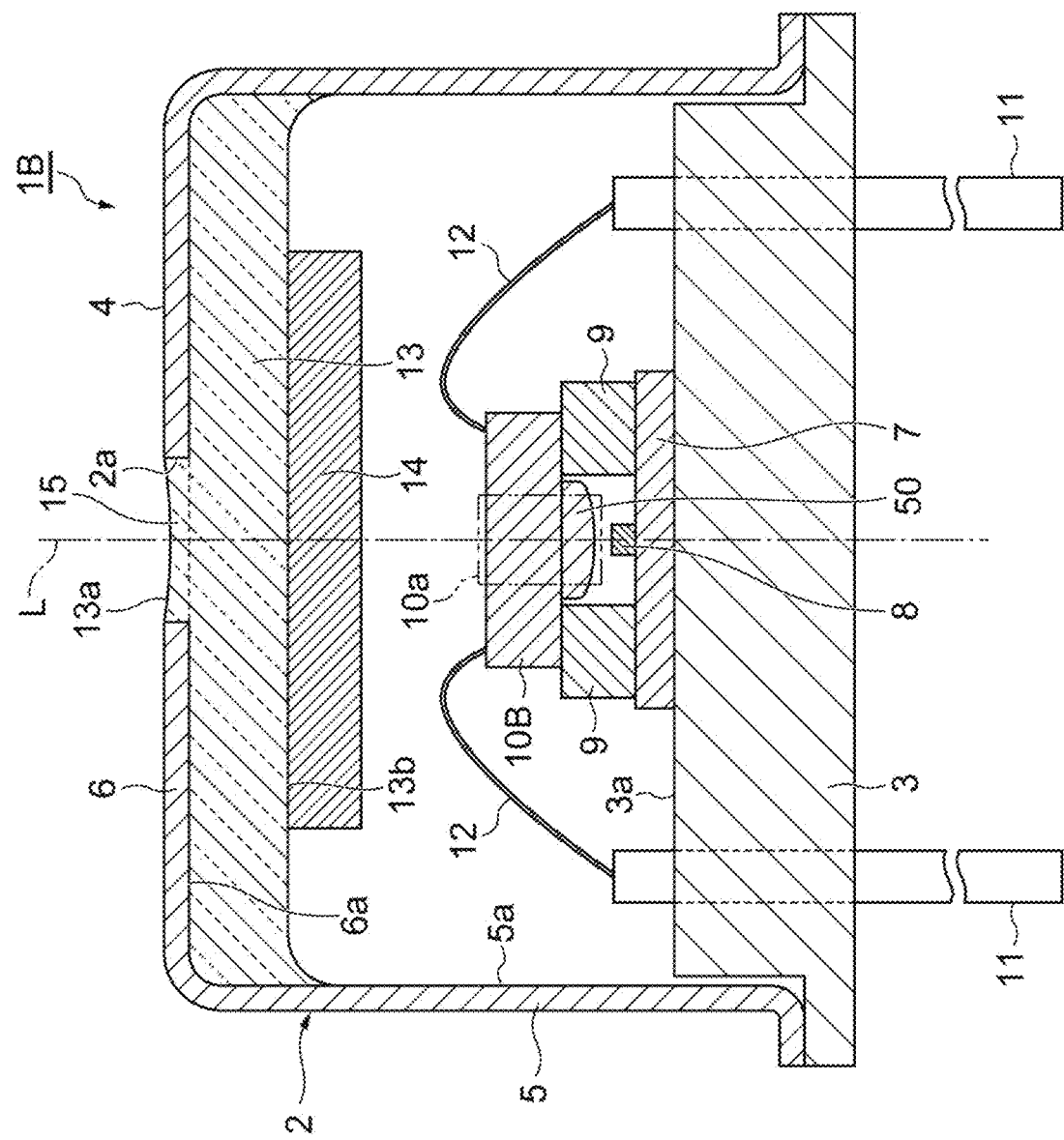
FIG. 6 is a cross-sectional view of a light detection device of a second embodiment.
Figure 7:
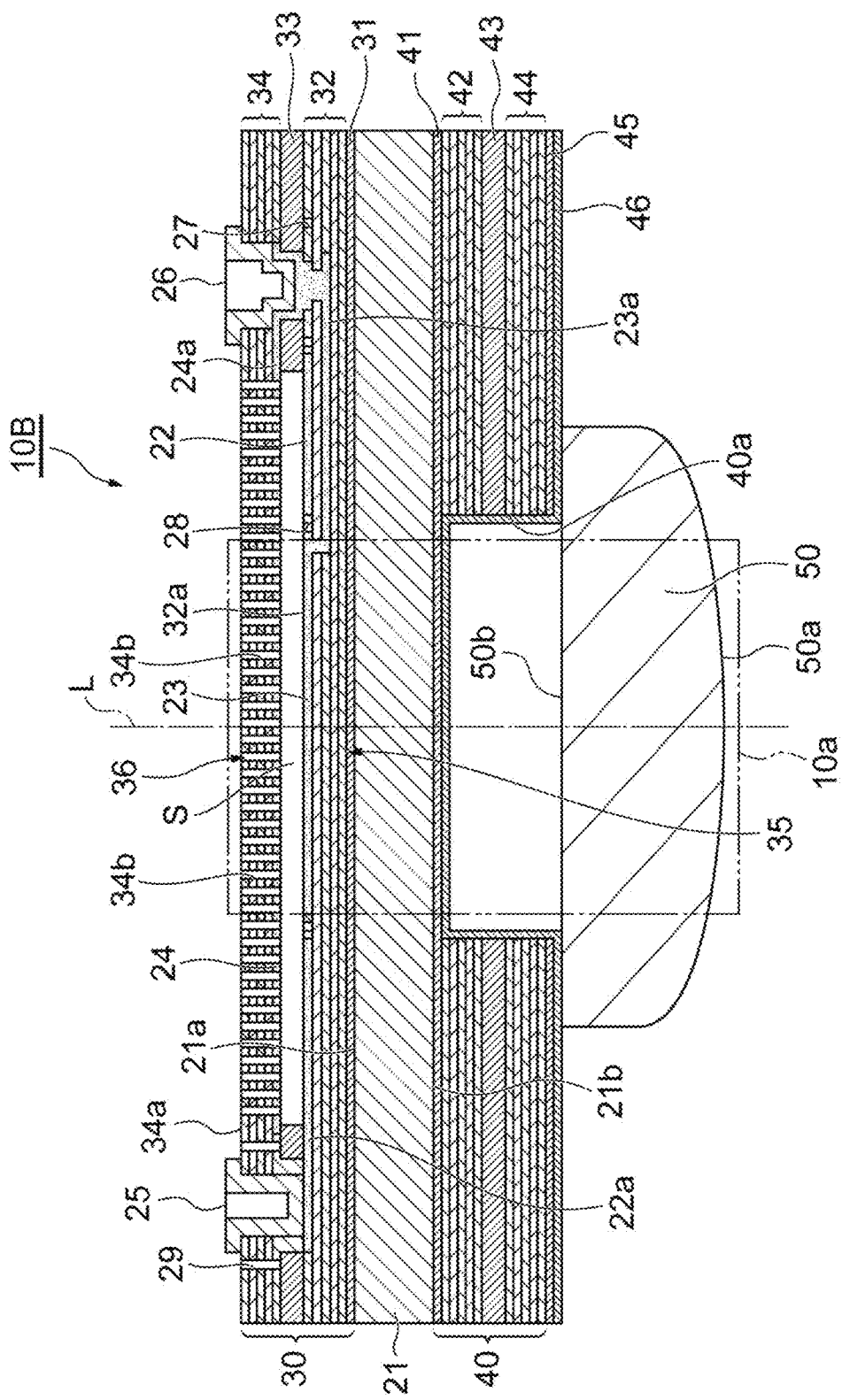
FIG. 7 is a cross-sectional view of a Fabry-Perot interference filter of the light detection device illustrated in FIG. 6.

As illustrated in FIG. 6, a light detection device 1B is different from the light detection device 1A described above mainly in the configuration of a Fabry-Perot interference filter 10B. As illustrated in FIG. 7, a lens unit 50 is a separate body from a substrate 21 in the Fabry-Perot interference filter 10B. The lens unit 50 has a light emitting surface 50a convex toward the light emission side and a flat light incident surface 50b. The light incident surface 50b of the lens unit 50 is secured to a surface of a protective layer 46 on a light detector 8 side for example by an adhesive agent to close an opening 40a. That is, the lens unit 50 is attached to a second layer structure 40 so as to close the opening 40a. Note that an optical resin may be used as the adhesive agent for attaching the lens unit 50 to the second layer structure 40, and the optical resin may fill the opening 40a.

The center line of the lens unit 50 coincides with line L. When viewed from a direction parallel to line L, the perimeter of the lens unit 50 is positioned inside the perimeter of a window 15 of a package 2 and is positioned outside the perimeter of a light receiving region 8a of the light detector 8. In this example, the lens unit 50 has a diameter larger than that of a light transmission region 10a. As an example, in the case where the diameter of the lens unit 50 is about 1000 μm and the lens unit 50 is made of silicon, the refractive index of the lens unit 50 is 3.5. The height of the light emitting surface 50a convex toward the light emission side is 50 to 400 μm.

Figure 8:
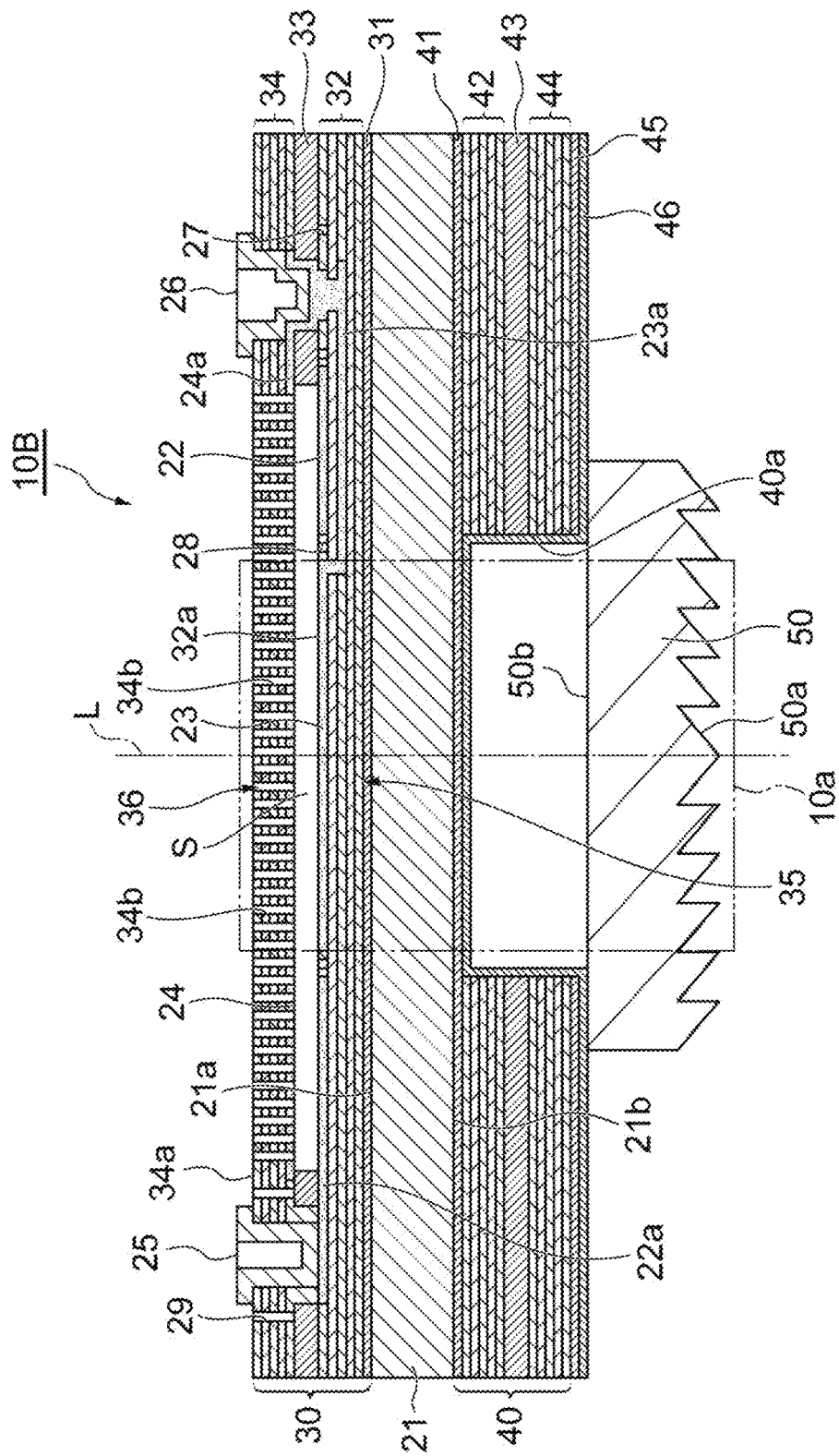
FIG. 8 is a cross-sectional view of a modification of the Fabry-Perot interference filter illustrated in FIG. 7.

Note that the lens unit 50 may be formed as a Fresnel lens as illustrated in FIG. 8. As an example, in the case where the diameter of the lens unit 50 is about 1000 μm, the thickness of the substrate of the lens unit 50 is 200 μm, and the lens unit 50 is made of silicon, the refractive index of the lens unit 50 is 3.5. The number of circles of the Fresnel lens is greater than or equal to ten, the height of the ruggedness is less than 40 μm, and the interval between circles is less than 50 μm. In the configurations illustrated in FIGS. 7 and 8, the lens unit 50 may be attached to the second layer structure 40 without a protective layer 46 interposed therebetween.

Since the lens unit 50 is integrally formed on a second surface 21b side of the substrate 21, like in the light detection device 1A described above, highly sensitive and highly accurate detection is possible also in the light detection device 1B configured as described above.

In the light detection device 1B, the lens unit 50 is attached to the second layer structure 40 so as to close the opening 40a. This configuration can improve the stress balance between a first surface 21a and the second surface 21b of the substrate 21 in the Fabry-Perot interference filter 10B. In addition, this configuration can increase the degree of freedom as to the shape (such as the curvature of a lens surface of the light emitting surface 50a) of the lens unit 50. Note that the opening 40a may not be completely closed by the lens unit 50 and that the inside and the outside of the opening 40a may be communicated with each other. In this case, generation of the stress due to expansion and contraction of the air in the opening 40a can be suppressed.

The center of gravity of the Fabry-Perot interference filter 10B is lowered since the lens unit 50 is positioned between spacers 9 in the light detection device 1B (see FIG. 6), which can improve the stability of the Fabry-Perot interference filter 10B.

In addition, since the opening 40a can serve as a reference for alignment when the lens unit 50 is attached to the second layer structure 40, the lens unit 50 can be accurately and easily mounted.

Furthermore, in the case of manufacturing the Fabry-Perot interference filter 10B at the wafer level in a semiconductor manufacturing process, mounting the lens unit 50 also at the wafer level allows the Fabry-Perot interference filter 10B having the small-sized lens unit 50 with high positional accuracy to be easily manufactured.

Third Embodiment

Figure 9:
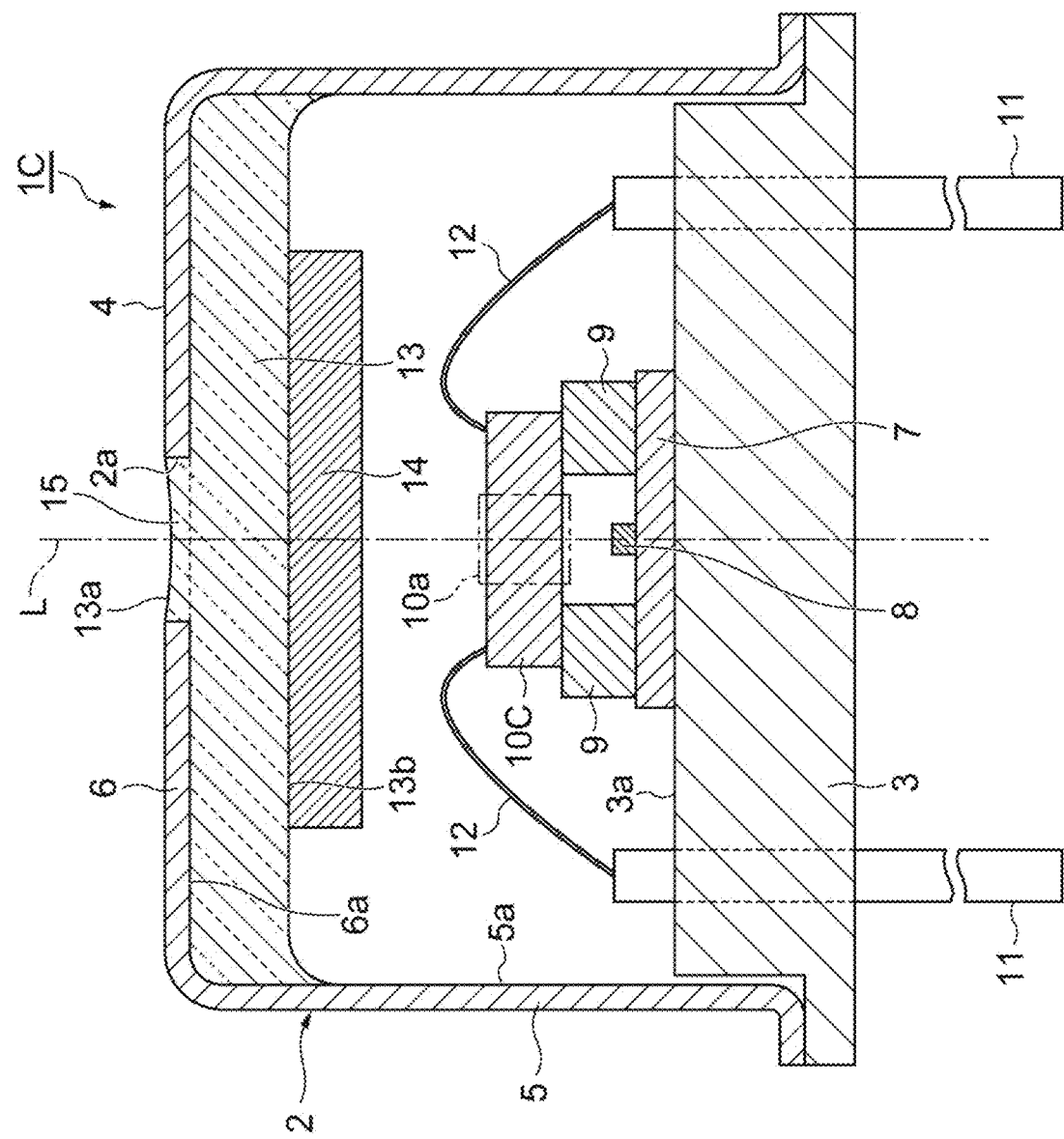
FIG. 9 is a cross-sectional view of a light detection device of a third embodiment.
Figure 10:
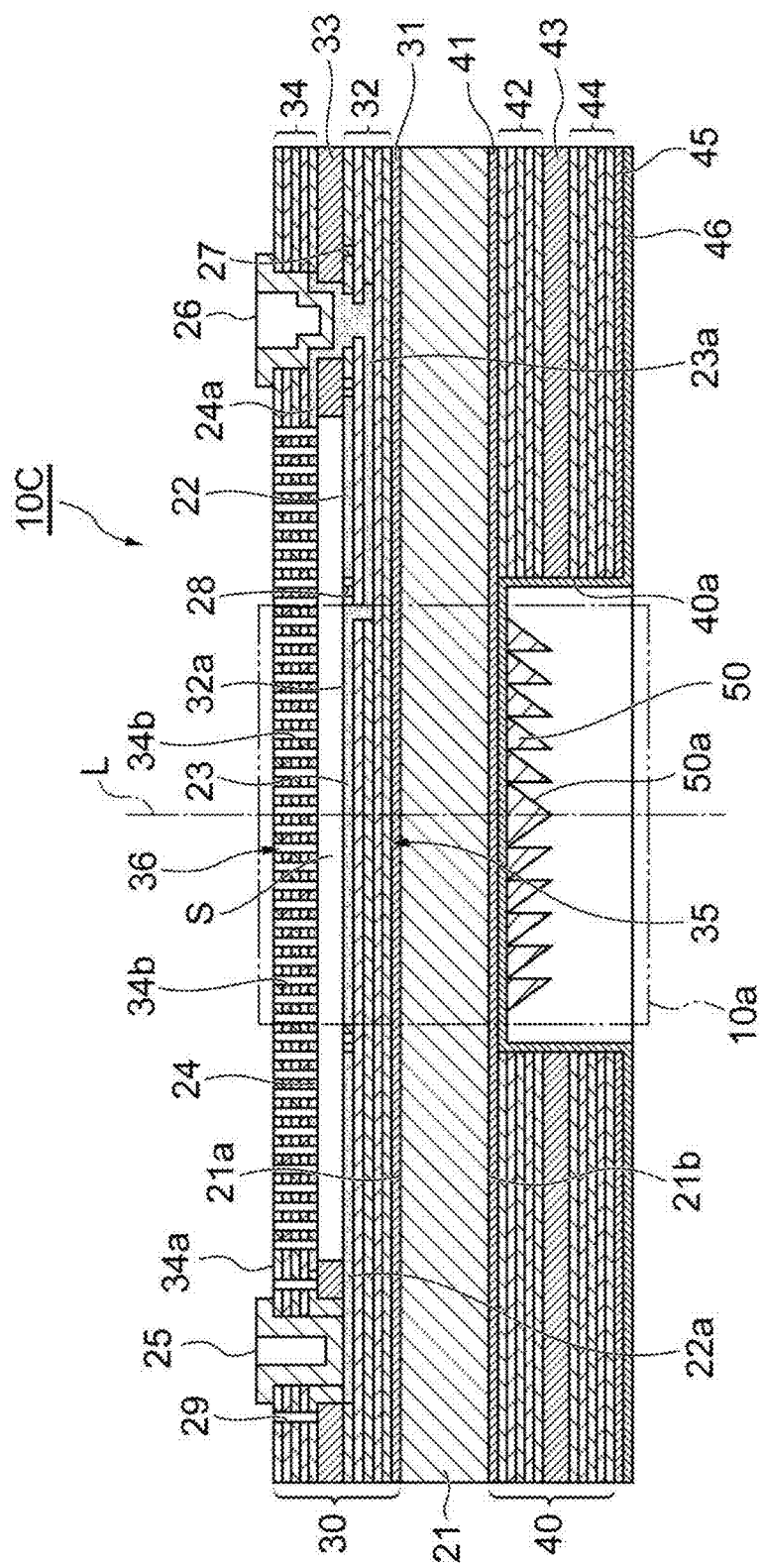
FIG. 10 is a cross-sectional view of a Fabry-Perot interference filter of the light detection device illustrated in FIG. 9.

As illustrated in FIG. 9, a light detection device 1C is different from the light detection device 1A described above mainly in the configuration of a Fabry-Perot interference filter 10C. As illustrated in FIG. 10, a lens unit 50 is a separate body from a substrate 21 in the Fabry-Perot interference filter 10C. The lens unit 50 is arranged in an opening 40a and formed on a protective layer 46. That is, the lens unit 50 is indirectly formed on a second surface 21b of the substrate 21 via a second antireflection layer 41 and the protective layer 46. Note that the lens unit 50 may be directly formed on the second surface 21b of the substrate 21 without the second antireflection layer 41 and the protective layer 46 interposed therebetween.

The lens unit 50 is formed as a Fresnel lens. As an example, the diameter of the lens unit 50 is about 750 μm. The number of circles of the Fresnel lens is ten to 50, the height of the ruggedness is 5 to 40 μm, and the interval between circles is 5 to 50 μm. Such a lens unit 50 is formed by forming a resist pattern (resin) using a 3D mask, using a mold, or other means.

Figure 11:
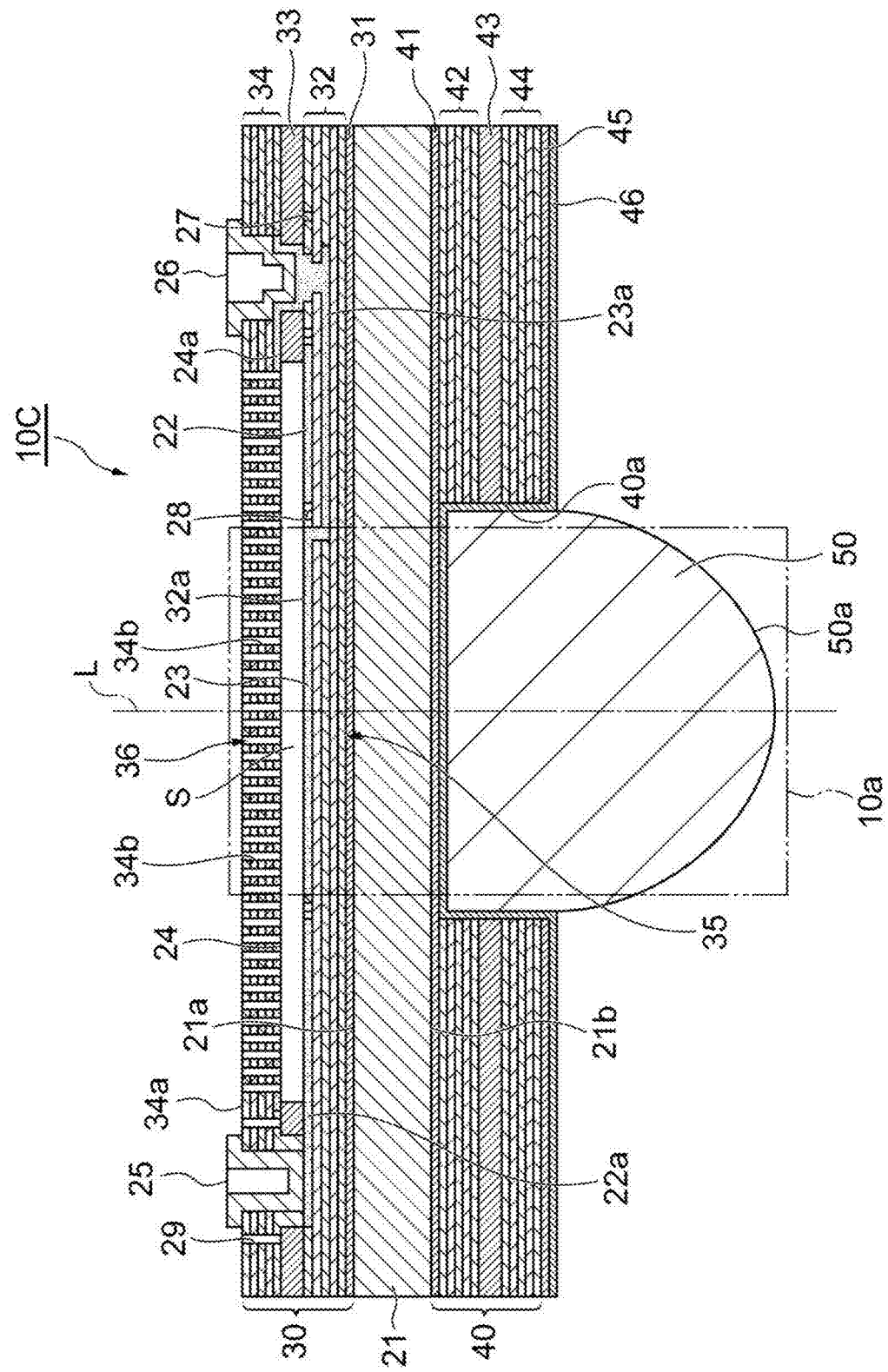
FIG. 11 is a cross-sectional view of a modification of the Fabry-Perot interference filter illustrated in FIG. 10.

Note that the lens unit 50 may be formed as a convex lens having a light emitting surface 50a convex toward the light emission side as illustrated in FIG. 11. As an example, the diameter of the lens unit 50 is about 750 μm. The height of the light emitting surface 50a convex toward the light emission side is 100 to 400 μm. Such a lens unit 50 is formed by forming a resist pattern (resin) using a 3D mask, forming a resist pattern (resin) using a normal mask and curing, using a mold, or other means.

Figure 12:
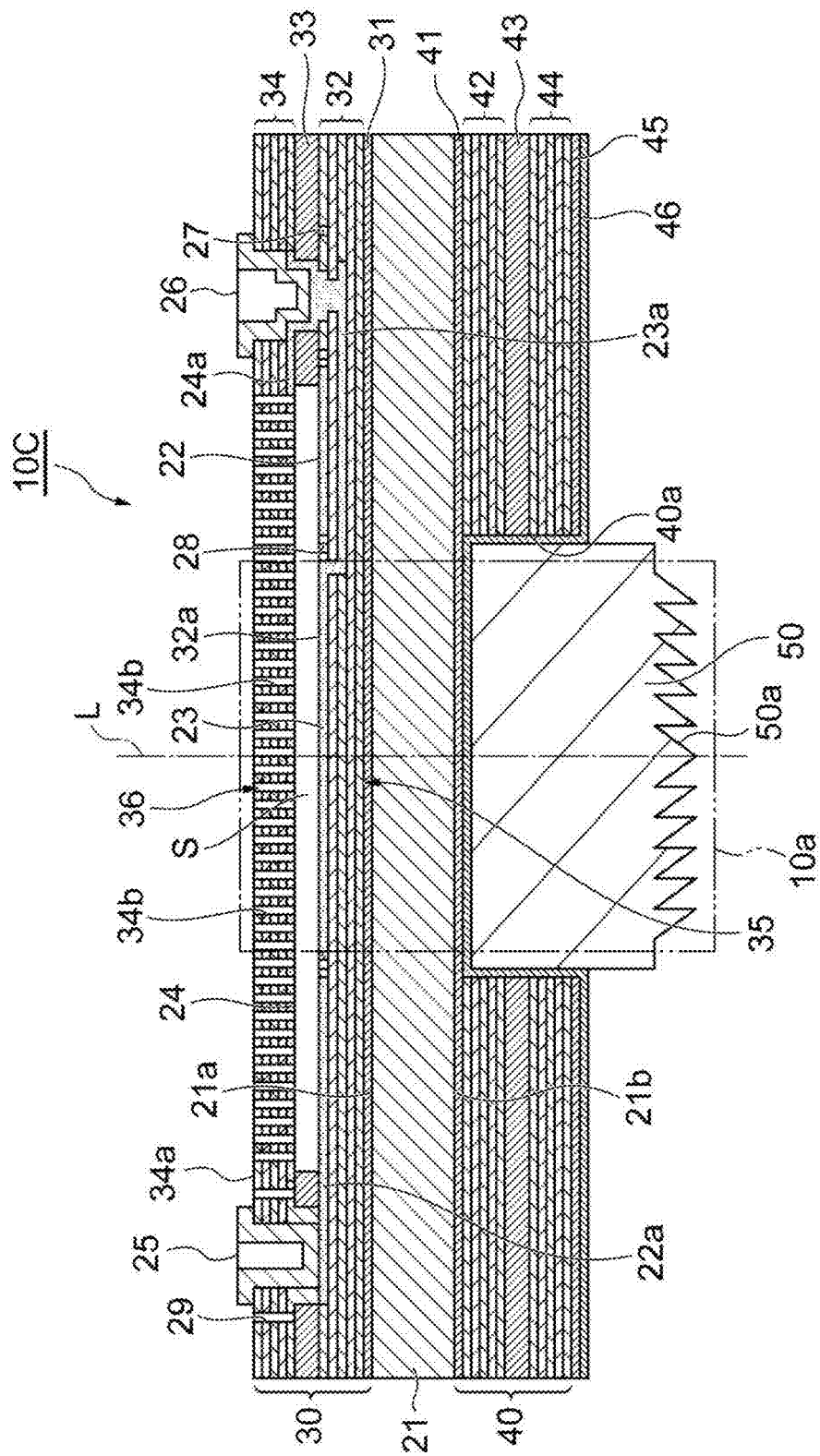
FIG. 12 is a cross-sectional view of a modification of the Fabry-Perot interference filter illustrated in FIG. 10.
Figure 13:
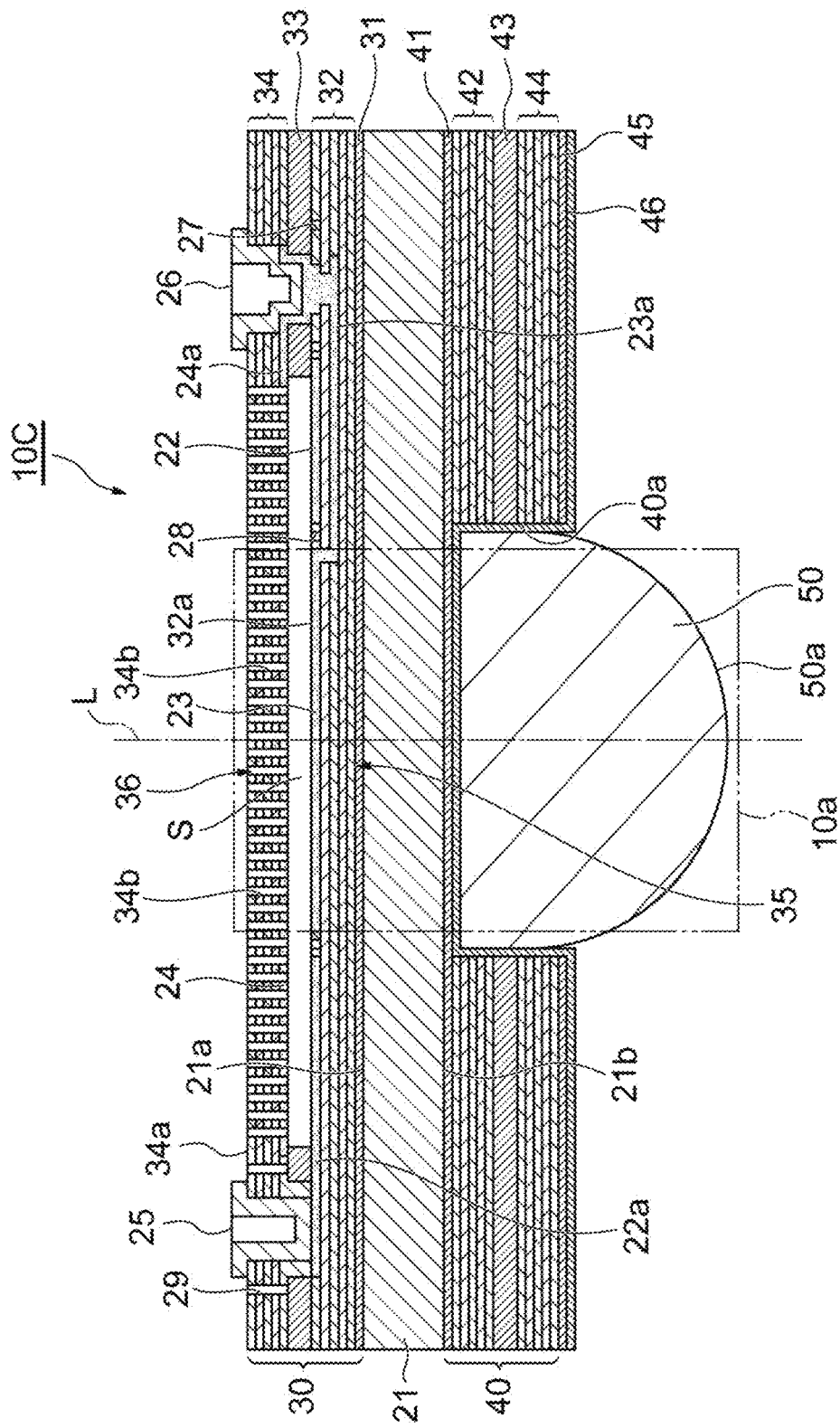
FIG. 13 is a cross-sectional view of a modification of the Fabry-Perot interference filter illustrated in FIG. 10.

Alternatively as illustrated in FIG. 12 and FIG. 13, a lens unit 50 which is a separate body from the substrate 21 may be secured in the opening 40a for example by an adhesive agent. Also in this case, the lens unit 50 may be formed indirectly on the second surface 21b of the substrate 21 via the second antireflection layer 41 and the protective layer 46, or may be directly formed on the second surface 21b of the substrate 21 without the second antireflection layer 41 and the protective layer 46 interposed therebetween.

In the case where the lens unit 50 is a Fresnel lens as illustrated in FIG. 12, and as an example, the diameter of the lens unit 50 is about 750 μm, the thickness of the substrate of the lens unit 50 is 200 μm, and the lens unit 50 is made of silicon, the refractive index of the lens unit 50 is 3.5. The number of circles of the Fresnel lens is greater than or equal to five, the height of the ruggedness is less than 30 μm, and the interval between circles is less than 80 μm.

In the case where the lens unit 50 is a convex lens as illustrated in FIG. 13, and as an example, the diameter of the lens unit 50 is about 750 μm, and the lens unit 50 is made of silicon, the refractive index of the lens unit 50 is 3.5. The height of the light emitting surface 50a convex toward the light emission side is 50 to 400 μm.

Since the lens unit 50 is integrally formed on the second surface 21b side of the substrate 21, like in the light detection device 1A described above, highly sensitive and highly accurate detection is possible also in the light detection device 1C configured as described above.

Moreover, the lens unit 50 is formed directly or indirectly on the second surface 21b of the substrate 21 in the light detection device 1C. According to this configuration, the stress balance of the Fabry-Perot interference filter 10C can be improved as compared with the case where the lens unit 50 is formed at a portion of the substrate 21. In addition, this configuration can increase the degree of freedom as to the shape (such as the curvature of a lens surface of the light emitting surface 50a) of the lens unit 50.

The lens unit 50 is arranged in the opening 40a in the light detection device 1C. This configuration can suppress misalignment of the position of the lens unit 50 even in a case where the lens unit 50 is a separate body from the substrate 21. In addition, this can improve the light collecting function of the lens unit 50 while the thickness of the Fabry-Perot interference filter 10C is suppressed from increasing, for example by increasing the thickness of the lens unit 50 by the amount by which the lens unit 50 is arranged in the opening 40a. Moreover, disposing the entire lens unit 50 in the opening 40a can prevent damage and contamination of the lens unit 50.

In addition, since the opening 40a can serve as a reference for alignment for fitting into the opening 40a when the lens unit 50 is attached to the second surface 21b of the substrate 21, the lens unit 50 can be accurately and easily mounted.

Furthermore, in the case of manufacturing the Fabry-Perot interference filter 10C at the wafer level in a semiconductor manufacturing process, mounting the lens unit 50 also at the wafer level allows the Fabry-Perot interference filter 10C having the small-sized lens unit 50 with high positional accuracy to be easily manufactured.

Figure 14:
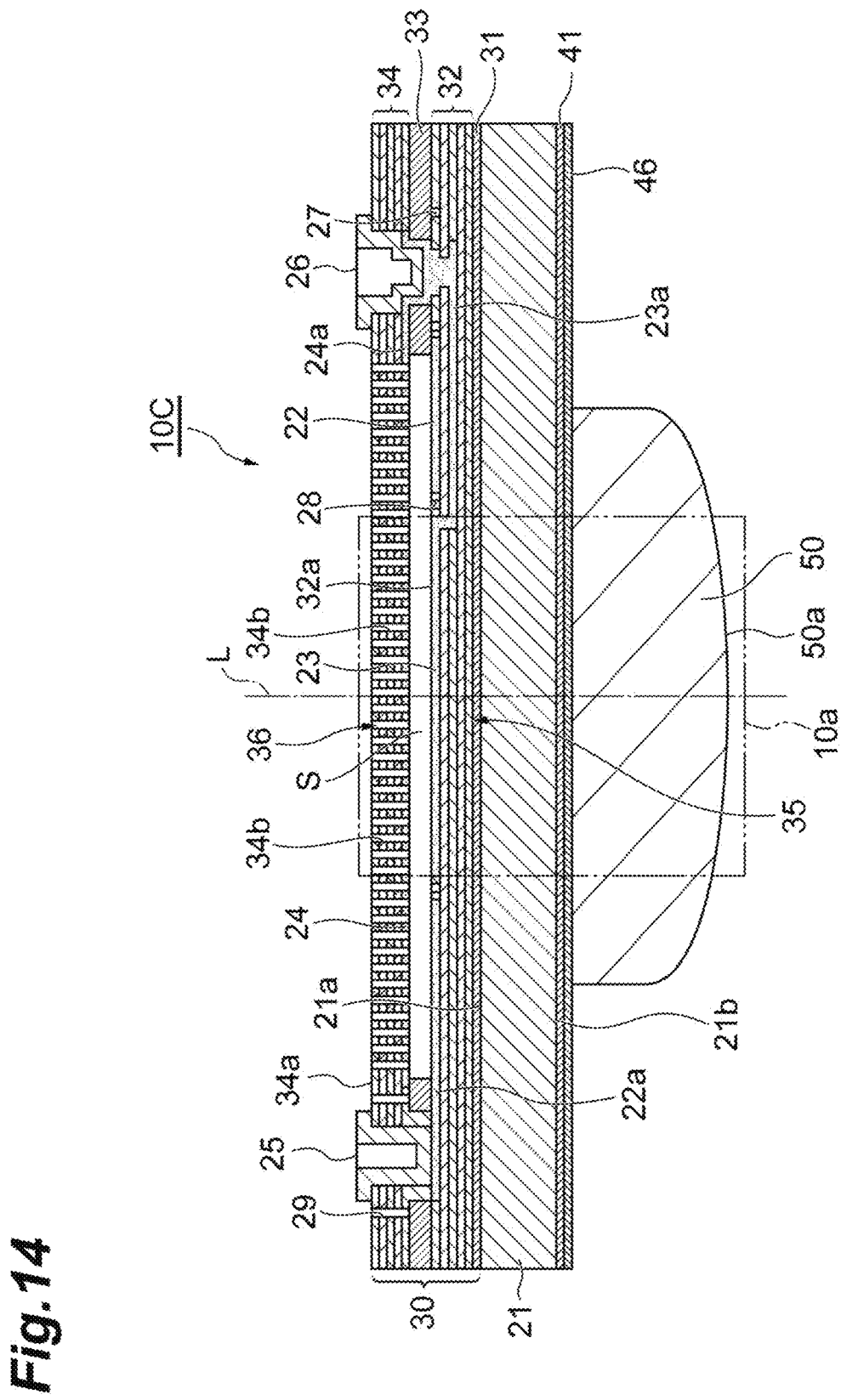
FIG. 14 is a cross-sectional view of a modification of the Fabry-Perot interference filter illustrated in FIG. 10.
Figure 15:
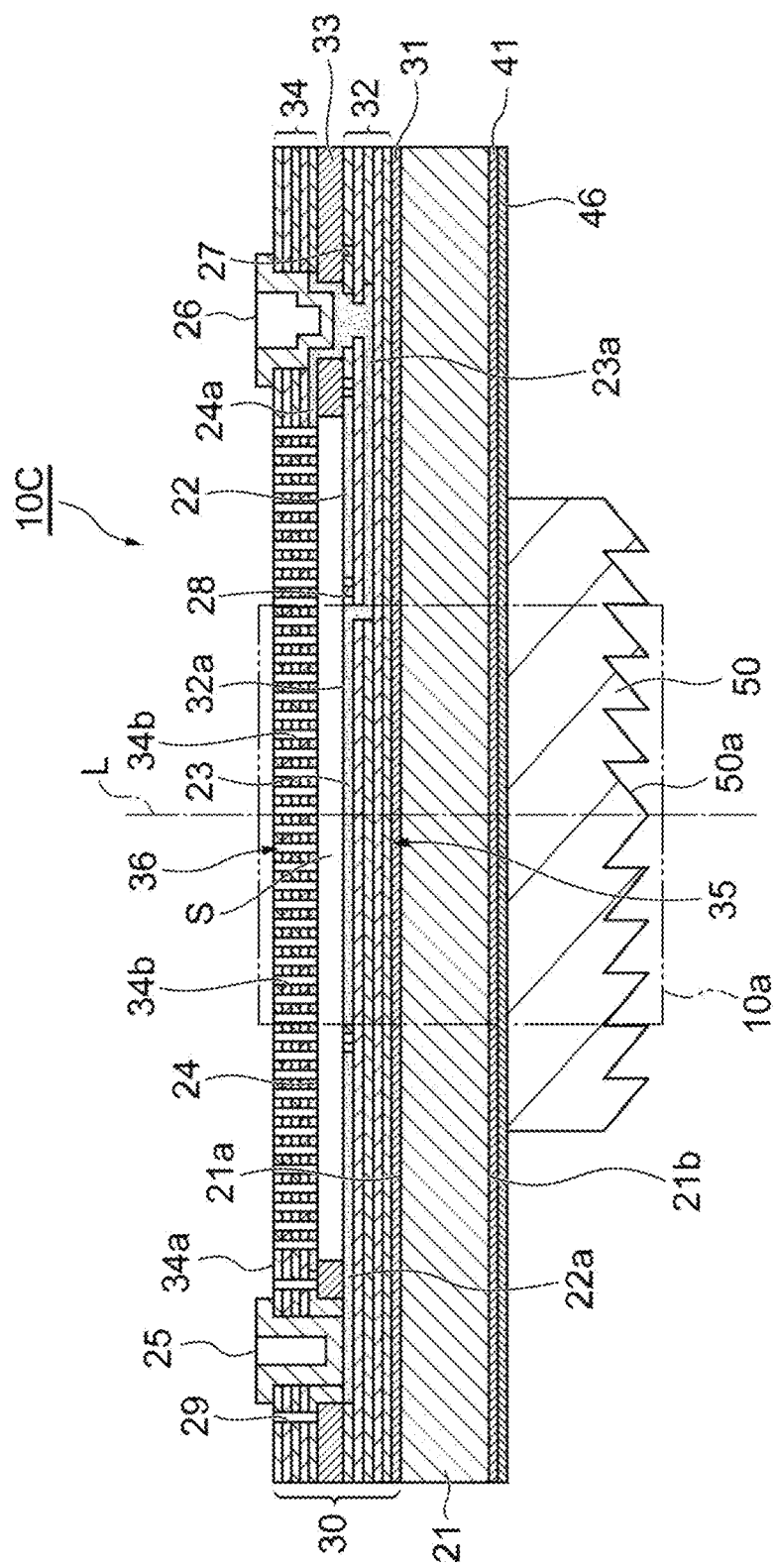
FIG. 15 is a cross-sectional view of a modification of the Fabry-Perot interference filter illustrated in FIG. 10.

Note that the second layer structure 40 may not be formed on the second surface 21b of the substrate 21 as illustrated in FIGS. 14 and 15. Also in this case, the stress balance of the Fabry-Perot interference filter 10C can be improved as compared with the case where the lens unit 50 is formed at a portion of the substrate 21. In addition, this configuration can increase the degree of freedom as to the shape (such as the curvature of a lens surface of the light emitting surface 50a) of the lens unit 50.

In the case where the lens unit 50 is a convex lens as illustrated in FIG. 14, and as an example, the diameter of the lens unit 50 is about 1000 μm, and the lens unit 50 is made of silicon, the refractive index of the lens unit 50 is 3.5. The height of the light emitting surface 50a convex toward the light emission side is 50 to 400 μm. Note that a light shielding layer 45 may be formed on the second surface 21b side of the substrate 21 so as to surround the lens unit 50.

In the case where the lens unit 50 is a Fresnel lens as illustrated in FIG. 15, and as an example, the diameter of the lens unit 50 is about 1000 μm, the thickness of the substrate of the lens unit 50 is 200 μm, and the lens unit 50 is made of silicon, the refractive index of the lens unit 50 is 3.5. The number of circles of the Fresnel lens is greater than or equal to ten, the height of the ruggedness is less than 40 μm, and the interval between circles is less than 50 μm. Note that a light shielding layer 45 may be formed on the second surface 21b side of the substrate 21 so as to surround the lens unit 50.

[Modifications]

Although the first embodiment, the second embodiment, and the third embodiment of the present disclosure have been described above, the present disclosure is not limited to the embodiments described above. For example, the materials and the shapes of the respective configurations are not limited to the aforementioned materials or shapes but may employ various materials or shapes.

The lens unit 50 is only required to be integrally formed on the second surface 21b of the substrate 21. That is, the lens unit 50 is only required to be provided posterior to the first mirror 35 and the second mirror 36 as a part of one of the Fabry-Perot interference filters 10A, 10B, and 10C at the time of manufacture of the Fabry-Perot interference filters 10A, 10B, and 10C, respectively.

The second layer structure 40 may not have a laminate structure symmetrical to the first layer structure 30 with respect to the substrate 21 as long as the second layer structure 40 is structured to correspond to the first layer structure 30. In the case where the second layer structure 40 has a layer structure capable of suppressing warpage or the like of the substrate 21 as compared with the case where the second layer structure 40 is not included, the second layer structure 40 can be said to correspond to the first layer structure 30.

Moreover, the band pass filter 14 may be formed on the light incident surface 13a of the light transmitting member 13 or may be formed on both the light incident surface 13a and the light emitting surface 13b of the light transmitting member 13.

When viewed from a direction parallel to line L, the perimeter of a light transmission region 10a of the Fabry-Perot interference filter 10A, 10B, or 10C may be positioned outside the perimeter of the window 15. In this case, the ratio of light entering the light transmission region 10a out of light incident from the window 15 increases, and the utilization efficiency of the light incident from the window 15 increases. Moreover, even when the position of the window 15 with respect to the light transmission region 10a is shifted to some extent, since light incident from the window 15 enters the light transmission region 10a, requirement of positional accuracy at the time of assembly of the light detection device 1A, 1B, or 1C is relaxed. Note that the perimeter of the window 15 may be positioned outside the perimeter of the light transmission region 10a, and in this case, the amount of light that can be taken in from the window 15 can be increased. This can relax the requirement of the position accuracy of the light detector 8 with respect to the window 15.

Reference Example

As illustrated in FIG. 16, a Fabry-Perot interference filter 100 includes a first substrate 101, a second substrate 102, a first mirror 103, a second mirror 104, a first electrode 105, a second electrode 106, and a lens unit 107. In the Fabry-Perot interference filter 100, a light transmission region 110a is set for example with line L as the center line.

The first substrate 101 and the second substrate 102 overlap each other in a direction parallel to line L. A surface 101a of the first substrate 101 is joined to a surface 102a of the second substrate 102. The first mirror 103 is provided at a portion of the first substrate 101 corresponding to the light transmission region 110a. The second mirror 104 is provided at a portion of the second substrate 102 corresponding to the light transmission region 110a. The first mirror 103 and the second mirror 104 face each other via a gap S in the direction parallel to line L. The first electrode 105 is provided on the first substrate 101 so as to surround the first mirror 103 when viewed from the direction parallel to line L. The second electrode 106 is provided on the second substrate 102 so as to surround the second mirror 104 when viewed from the direction parallel to line L. The first electrode 105 and the second electrode 106 face each other via the gap S in a direction parallel to line L.

A groove 102c is formed on a surface 102b of the second substrate 102 on the opposite side to the first substrate 101 so as to surround the second mirror 104 and the second electrode 106 when viewed from the direction parallel to line L. The portion of the second substrate 102 surrounded by the groove 102c is displaceable in the direction parallel to line L, with the portion where the groove 102c is formed serving as a diaphragm-like holder 102d. Note that the diaphragm-like holder 102d may be formed by a groove formed on the surface 102a of the second substrate 102 so as to surround the second mirror 104 and the second electrode 106 when viewed from the direction parallel to line L. Alternatively, a diaphragm-like holder may be formed by a groove formed on a surface 101b of the first substrate 101 on the opposite side to the second substrate 102 or on the surface 101a of the first substrate 101 so as to surround the first mirror 103 and the first electrode 105 when viewed from the direction parallel to line L. In this case, the portion of the first substrate 101 surrounded by the groove is displaceable in the direction parallel to line L, with the portion where the groove is formed serving as the diaphragm-like holder. Further alternatively, instead of the diaphragm-like holder, a holder may be formed by a plurality of beams arranged radially about line L.

In the Fabry-Perot interference filter 100, when a voltage is applied between the first electrode 105 and the second electrode 106, electrostatic force corresponding to the voltage is generated between the first electrode 105 and the second electrode 106. The portion of the second substrate 102 surrounded by the groove 102c is pulled toward the first substrate 101 by the electrostatic force, thereby adjusting the distance between the first mirror 103 and the second mirror 104. Then, light having a wavelength corresponding to the distance between the first mirror 103 and the second mirror 104 passes through the first mirror 103 and the second mirror 104 from the first substrate 101 side to the second substrate 102 side.

The lens unit 107 is integrally formed on the surface 102b of the second substrate 102. The lens unit 107 condenses light transmitted by the first mirror 103 and the second mirror 104. The lens unit 107 is provided directly or indirectly on the surface 102b as a Fresnel lens. Note that the lens unit 107 may be provided directly or indirectly on the surface 102b as a convex lens. The lens unit 107 may be formed as a Fresnel lens or a convex lens at a portion on the surface 102b side of the second substrate 102.

As an example, the light transmitted by the first mirror 103 and the second mirror 104 is condensed by the lens unit 107 onto the light detector (light detector arranged separated from the Fabry-Perot interference filter 100) arranged in the package accommodating the Fabry-Perot interference filter 100 or outside the package. According to the Fabry-Perot interference filter 100 configured as described above, since the lens unit 107 is integrally formed on the surface 102b of the second substrate 102, highly sensitive and highly accurate detection can be achieved in the posterior light detector.

A specific configuration of the Fabry-Perot interference filter 100 will be described below. The first substrate 101 and the second substrate 102 each have a rectangular plate shape and are made of, for example, various glasses such as soda glass, crystalline glass, quartz glass, lead glass, potassium glass, borosilicate glass, or non-alkali glass, or quartz. The thickness of the first substrate 101 is, for example, about 500 μm. The thickness of the second substrate 102 is, for example, about 200 μm. The surface 101a of the first substrate 101 and the surface 102a of the second substrate 102 are joined to each other by, for example, a plasma polymerized film.

The first substrate 101 has a surface 101c and a surface 101d facing the surface 102a of the second substrate 102 via the gap S in the direction parallel to line L. The surface 101c is formed in a circular shape with line L as the center line. The surface 101d is formed in an annular shape with line L as the center line so as to surround the surface 101c when viewed from the direction parallel to line L. The distance between the surface 101c of the first substrate 101 and the surface 102a of the second substrate 102 is smaller than the distance between the surface 101d of the first substrate 101 and the surface 102a of the second substrate 102. The groove 102c for forming the diaphragm in the second substrate 102 is formed in an annular shape with line L as the center line. The surfaces 101c and 101d of the first substrate 101 are formed by performing etching on the first substrate 101 from the surface 101a. The groove 102c of the second substrate 102 is formed by performing etching on the second substrate 102 from the surface 102b.

The first mirror 103 is formed on the surface 101c of the first substrate 101. The second mirror 104 is formed on the surface 102a of the second substrate 102. The first mirror 103 and the second mirror 104 are, for example, a metal film, a dielectric multilayer film, or a composite film thereof, and are each formed in a round film shape with line L as the center line.

The first electrode 105 is formed on the surface 101d of the first substrate 101. The second electrode 106 is formed on the surface 102a of the second substrate 102. The first electrode 105 and the second electrode 106 are made of a metal material, for example, and each extend in an annular shape with line L as the center line. The first electrode 105 is electrically connected with an electrode pad (not illustrated) provided in a region of the first substrate 101 accessible from the outside via a wire (not illustrated). The wire is provided for example in a groove formed on the surface 101a of the first substrate 101. The second electrode 106 is electrically connected with an electrode pad (not illustrated) provided in a region of the second substrate 102 accessible from the outside via a wire (not illustrated). The wire is provided for example in a groove formed on the surface 102a of the second substrate 102.

The lens unit 107 is made of, for example, silicon, resin, or glass. The lens unit 107 is joined to a region of the surface 102a of the second substrate 102 inside the groove 102c by, for example, an optical resin. When viewed from the direction parallel to line L, the perimeter of the lens unit 107 includes the perimeter of the first mirror 103 and the perimeter of the second mirror 104.

A light shielding layer 108 having an opening 108a is formed on the surface 101b of the first substrate 101. The light shielding layer 108 is made of, for example, a metal material. The opening 108a is formed in a circular shape with line L as the center line and functions as an aperture for narrowing light incident on the light transmission region 110a. An antireflection layer may be formed in each of a region of the surface 101b of the first substrate 101 facing at least the first mirror 103 (that is, a region at least inside the opening 108a) and a region of the surface 102b of the second substrate 102 facing at least the second mirror 104 (that is, a region facing at least the lens unit 107).

REFERENCE SIGNS LIST 1A, 1B, 1C . . . light detection device, 2 . . . package, 8 . . . light detector, 8a . . . light receiving region, 9 . . . spacer (support), 10A, 10B, 10C Fabry-Perot interference filter, 15 . . . window, 21 . . . substrate, 21a . . . first surface, 21b . . . second surface, 30 . . . first layer structure, 35 . . . first mirror, 36 . . . second mirror, 40 . . . second layer structure, 40a . . . opening, 50 . . . lens unit, S . . . gap

The invention claimed is:

1. A light detection device comprising:
a package including a window configured to allow light to enter therefrom;
a Fabry-Perot interference filter arranged in the package and configured to transmit the light incident from the window; and
a light detector arranged in the package in a state of being separated from the Fabry-Perot interference filter, the light detector configured to detect the light transmitted by the Fabry-Perot interference filter,
wherein the Fabry-Perot interference filter includes:
a substrate having a first surface on the window side and a second surface on the light detector side;
a first layer structure arranged on the first surface, the first layer structure having a first mirror and a second mirror facing each other via a gap, a distance between the first mirror and the second mirror being variable; and
a lens unit integrally formed on the second surface side and configured to condense the light transmitted by the first mirror and the second mirror onto the light detector.

2. The light detection device according to claim 1, wherein the lens unit is formed at a portion of the substrate on the second surface side.

3. The light detection device according to claim 1, wherein the lens unit is formed directly or indirectly on the second surface.

4. The light detection device according to claim 3,
wherein the Fabry-Perot interference filter further includes a second layer structure arranged on the second surface and structured to correspond to the first layer structure,
an opening is formed in the second layer structure, the opening through which the light transmitted by the first mirror and the second mirror passes, and
the lens unit is arranged in the opening.

5. The light detection device according to claim 1,
wherein the Fabry-Perot interference filter further includes a second layer structure arranged on the second surface and structured to correspond to the first layer structure,
an opening is formed in the second layer structure, the opening through which the light transmitted by the first mirror and the second mirror passes, and the lens unit is attached to the second layer structure so as to close the opening.

6. The light detection device according to claim 1, wherein a perimeter of the lens unit is positioned inside a perimeter of the window and positioned outside a perimeter of a light receiving region of the light detector when viewed from a direction in which the light is incident.

7. The light detection device according to claim 2, wherein a perimeter of the lens unit is positioned inside a perimeter of the window and positioned outside a perimeter of a light receiving region of the light detector when viewed from a direction in which the light is incident.

8. The light detection device according to claim 3, wherein a perimeter of the lens unit is positioned inside a perimeter of the window and positioned outside a perimeter of a light receiving region of the light detector when viewed from a direction in which the light is incident.

9. The light detection device according to claim 4, wherein a perimeter of the lens unit is positioned inside a perimeter of the window and positioned outside a perimeter of a light receiving region of the light detector when viewed from a direction in which the light is incident.

10. The light detection device according to claim 5, wherein a perimeter of the lens unit is positioned inside a perimeter of the window and positioned outside a perimeter of a light receiving region of the light detector when viewed from a direction in which the light is incident.

* * * * *